United States Patent
Fransen

(10) Patent No.: US 8,954,739 B2
(45) Date of Patent: Feb. 10, 2015

(54) EFFICIENT TERMINAL AUTHENTICATION IN TELECOMMUNICATION NETWORKS

(75) Inventor: Frank Fransen, Groningen (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/575,335

(22) PCT Filed: Jan. 24, 2011

(86) PCT No.: PCT/EP2011/050906
§ 371 (c)(1), (2), (4) Date: Jul. 26, 2012

(87) PCT Pub. No.: WO2011/092138
PCT Pub. Date: Aug. 4, 2011

(65) Prior Publication Data
US 2012/0311335 A1    Dec. 6, 2012

(30) Foreign Application Priority Data
Jan. 28, 2010   (EP) .................................... 10151964

(51) Int. Cl.
H04L 9/32 (2006.01)
H04W 12/06 (2009.01)
H04L 29/06 (2006.01)
H04W 12/04 (2009.01)
H04L 9/08 (2006.01)

(52) U.S. Cl.
CPC ............... H04W 12/06 (2013.01); H04L 63/06 (2013.01); H04L 63/0853 (2013.01);
(Continued)

(58) Field of Classification Search
CPC . H04L 63/06; H04L 63/0853; H04L 2209/80; H04L 9/0838; H04L 9/3273; H04L 9/3242; H04W 12/04; H04W 12/06
USPC .......................... 713/168, 170–171; 726/2–3; 380/277–278
See application file for complete search history.

(56) References Cited

U.S. PATENT DOCUMENTS 6,711,400 B1 * 3/2004 Aura .............................. 455/411
8,245,039 B2 * 8/2012 Jones ............................ 713/168

(Continued)

FOREIGN PATENT DOCUMENTS

WO   2008/151663   12/2008
WO   WO2010/049437 A1   5/2010

OTHER PUBLICATIONS

"3rd Generation Partnership Project; Technical Specification Group Services and System Aspects; Service Requirements for Machine-Type Communications; Stage 1 (Release 10)", 3GPP TS 22.368 V1.1.1. (Nov. 2009), pp. 1-23.

(Continued)

Primary Examiner — Samson Lemma
(74) Attorney, Agent, or Firm — McDonnell Boehnen Hulbert & Berghoff LLP

(57) ABSTRACT

The invention relates to AKA procedures for terminals (3) in a network. A method for enabling authentication and/or key agreement for a terminal (3) in a network is disclosed. The method involves the transfer of at least one AKA parameter ($RAND_{n+m}$; $RAND_{n+m}$, $AUTN_{n+m}$) from the network to the terminal (3) during a terminal session n. The AKA parameter enables authentication and/or key agreement procedure of the terminal (3) in the network for a subsequent terminal session n+m.

19 Claims, 13 Drawing Sheets

(52) U.S. Cl.
CPC ............ *H04W 12/04* (2013.01); *H04L 9/0838* (2013.01); *H04L 9/3242* (2013.01); *H04L 9/3273* (2013.01); *H04L 2209/80* (2013.01)
USPC ................ 713/170; 380/277; 380/278; 726/3

(56) References Cited

U.S. PATENT DOCUMENTS

| | | | | |
|---|---|---|---|---|
| 2005/0114680 | A1* | 5/2005 | Chinnaswamy et al. | 713/185 |
| 2007/0178885 | A1* | 8/2007 | Lev | 455/411 |
| 2010/0017603 | A1* | 1/2010 | Jones | 713/168 |

OTHER PUBLICATIONS

"3rd Generation Partnership Project; Technical Specification Group Services and Systems Aspects; Network Architecture (Release 9)", 3GPP TS 23.002 V9.2.0 (Dec. 2009), pp. 1-92.

"3rd Generation Partnership Project; Technical Specification Group Services and System Aspects; General Packet Radio Service (GPRS) Enhancements for Evolved Universal Terrestial Radio Access Network (E-UTRAN) Access (Release 8)", 3GPP TS 23.401 V8.8.0, (Dec. 2009), pp. 1-239.

Shidhani, Ali Al, "Reducing re-authentication delays during UMTS-WLAN vertical handovers," Personal, Indoor And Mobile Radio Communications, 2008, PIMRC 2008, IEEE 19th International Symposium On, IEEE, Piscataway, NJ, USA, Sep. 15, 2008, pp. 1-5.

3 GPP TS 33.401 V9.2.0 (Dec. 2009) 3rd Generation Partnership Project; Technical Specification Group Services and System Aspects; 3GPP System Architecture Evolution (SAE): Security architecture; (Release 9), 3GPP Organization Partners, pp. 1-104.

3GPP TS 33.102 V9.1.0 (Dec. 2009) 3rd Generation Partnership Project; Technical Specification Group Services and System Aspects; 3G Security; Security architecture (Release 9), 3 GPP Organizational Partners, pp. 1-71.

* cited by examiner

EFFICIENT TERMINAL AUTHENTICATION IN TELECOMMUNICATION NETWORKS

CROSS REFERENCE TO RELATED APPLICATIONS

The present application is a national stage entry of PCT/EP2011/050906, filed Jan. 24, 2011, and claims priority to EP 10151964.3, filed Jan. 28, 2010. The full disclosures of EP 10151964.3 and PCT/EP2011/050906 are incorporated herein by reference.

FIELD OF THE INVENTION

Generally, the invention relates to the field of authentication of terminals in wireless access telecommunication networks. More specifically, the invention relates to the field of authentication of terminals in telecommunication networks for machine-to-machine communication.

BACKGROUND OF THE INVENTION

In existing data transfer networks, terminals and particular nodes (e.g. a HLR/AuC or HSS/AuC) of a network cooperate in order to authenticate the terminals in the network and to encrypt data over the radio part of the network. A detailed description is provided in GSM Recommendation 03.20 for 2G networks, 3GPP TS 33.102 for 3G networks and 3GPP TS 33.401 for 4G networks.

Briefly, for GSM/GPRS networks, a secret key $K_i$ forms the cornerstone for the security mechanisms. The secret key $K_i$ is stored in the terminal (usually on the SIM card) and in the HLR/AuC of the network. The HLR/AuC generates a random number RAND in response to an authentication request from a terminal containing subscriber identifier IMSI for a particular terminal session. The RAND and the secret key $K_i$ are used to derive an encryption key $K_C$ using a key generation algorithm and to derive an expected response XRES under an authentication algorithm. The combination (RAND, XRES, $K_C$) forms a GSM authentication vector (triplet) transmitted from the HLR/AuC to an MSC or SGSN. The MSC/SGSN then transmits the random number RAND to the terminal and the encryption key $K_C$ to a base station, or SGSN in case of GPRS. The terminal and the network communicate wirelessly over a radio path between the base station and the terminal.

Upon receipt of the RAND, the terminal derives the encryption key $K_C$ using the key generation algorithm, the RAND and the secret key $K_i$ and also derives a response RES using the authentication algorithm, the RAND and the secret key $K_i$.

For authentication, the terminal sends the response RES over the radio path to the MSC/SGSN where the terminal-derived response RES is compared with the network-generated expected response XRES stored in the MSC/SGSN. When the terminal-derived RES matches the network-generates XRES, the terminal is authenticated in the network for the particular terminal session.

After authentication, the encryption key $K_C$ can be used to encrypt data transmitted over the radio path between the terminal and the base station that had stored the network-generated encryption key $K_C$. Encryption of the data on the radio path is performed using encryption key $K_C$ in combination with an encryption algorithm.

When the terminal session is terminated, the terminal should normally again follow the authentication procedure for a subsequent terminal session.

For UMTS networks, again an authentication request is received at the HLR/AuC containing subscriber identifier IMSI. Instead of a triplet authentication vector, a quintet authentication vector is generated containing again RAND and expected response XRES together with a cipher key CK, an integrity key IK and an authentication token AUTN. AUTN is generated in a manner known as such. The quintet authentication vector is sent to a further network node, such as the VLR/SGSN. Both RAND and AUTN are transmitted over the radio interface to the terminal. At the terminal, AUTN is verified for authentication of the network in a known manner and a response RES is computed and sent back to the network for authentication of the terminal in the network. Keys CK and IK can also be derived at the terminal using the secret key $K_i$ and the received RAND.

When the terminal session is terminated, the terminal should normally again follow the authentication procedure for a subsequent terminal session.

For 4G Evolved Packet Systems (EPS), the authentication procedure is similar to UMTS networks, although a new key hierarchy is used. The secret key $K_i$ stored in the USIM at the terminal side and the AuC at the network side is used to derive the keys CK and IK. CK and IK, in combination with a serving network ID are used to derive a new key, $K_{ASME}$. From this new key, $K_{ASME}$, other encryption and integrity keys are derived for protection of signalling between the terminal and the core network (key $K_{NASenc}$), protection of integrity between the terminal and the core network (key $K_{NAsint}$), the RRC signalling and user data transfer over the radio interface, the latter including encryption key $K_{UPenc}$.

The authentication and encryption procedures, generally known as Authentication and Key Agreement (AKA), involve a considerable message exchange. This message exchange may be a burden in particular cases, e.g. for machine-to-machine (M2M) communications currently being standardized in 3GPP (see e.g. TS 22.368). M2M applications typically involve hundreds, thousands or millions of communication modules. Some applications only rarely require access to a telecommunications network. An example involves collecting information by a server from e.g. smart electricity meters at the homes of a large customer base. Other examples include sensors, meters, coffee machines etc. that can be equipped with communication modules that allow for reporting status information to a data processing centre over the telecommunications network. Such devices may also be monitored from a server. The data processing centre may e.g. store the data and/or provide a schedule for maintenance people to repair a machine, meter, sensor etc.

SUMMARY OF THE INVENTION

It is an object of the invention to provide a more efficient authentication and/or key agreement (AKA) scheme for terminals in a telecommunications network.

A method for enabling authentication and/or key agreement for a terminal in a network is disclosed. The method involves the transfer of at least one AKA parameter ($RAND_{n+m}$; $RAND_{n+m}$, $AUTN_{n+m}$) from the network to a destination device, such as the terminal, during a terminal session n. The AKA parameter enables authentication and/or key agreement procedure of the terminal in the network for a subsequent terminal session n+m. The destination device may also be another network node or other receiving entity.

A computer program or set of cooperating programs comprising software code portions configured for, when executed by a processor, performing the steps of this method is also disclosed.

Also, a network or network node being configured for authentication and/or key agreement (AKA) for a terminal in the network is disclosed. The network or network node comprises a receiving interface configured for receiving an identifier (IMSI) of the terminal during a terminal session n. The network also contains a generator configured for generating at least one AKA parameter ($RAND_{n+m}$; $RAND_{n+m}$, $AUTN_{n+m}$) enabling authentication and/or key agreement for the identified terminal in the network or network node for a subsequent terminal session n+m. The network or network node has a transmitting interface configured for transmitting the at least one AKA parameter ($RAND_{n+m}$; $RAND_{n+m}$, $AUTN_{n+m}$) destined for the terminal.

Moreover, an AKA vector signal for a network is disclosed. The AKA vector signal contains at least one parameter for a terminal session n and at least one parameter for a subsequent terminal session n+m of the same terminal in the network. For 2G networks, this AKA vector may comprise [$RAND_{n+m}$, $XRES_n$, $Kc_n$]; for 3G networks [$RAND_{n+m}$, $AUTN_{n+m}$, $XRES_n$, $IK_n$, $CK_n$] and for 4G networks [$RAND_{n+m}$, $AUTN_{n+m}$, $XRES_n$, $K_{ASME_n}$].

Further, a method for enabling authentication and/or key agreement (AKA) for a terminal in a network is disclosed. The terminal receives during a terminal session n at least one AKA parameter ($RAND_{n+m}$; $RAND_{n+m}$, $AUTN_{n+m}$). In order to establish a subsequent terminal session n+m, the terminal uses the AKA parameter received during the previous terminal session n for authentication and/or key agreement of the terminal with the network.

A computer program or set of cooperating programs comprising software code portions configured for, when executed by a processor, performing the steps of this method is also disclosed.

Still further, a terminal configured for authentication and/or key agreement (AKA) at a network is disclosed. The terminal comprises a receiving interface configured for receiving, during a terminal session n, at least one AKA parameter ($RAND_{n+m}$; $RAND_{n+m}$, $AUTN_{n+m}$) for a subsequent terminal session n+m from the network. The terminal contains a processor configured for deriving an authentication message ($RES_{n+m}$) and/or a key using the at least one AKA parameter ($RAND_{n+m}$; $RAND_{n+m}$, $AUTN_{n+m}$) received during the terminal session n. The terminal has a transmitting interface configured for transmitting, during the subsequent terminal session n+m, the derived authentication message ($RES_{n+m}$) and/or the data encrypted under the derived key to the network for authentication and/or key agreement for the terminal in the network.

Finally, a system comprising at least one terminal and a network node of a telecommunications network is disclosed. The network node comprises a receiving interface, a generator and a transmitting interface. The receiving interface is configured for receiving an identifier (IMSI) of the terminal during a terminal session n. The generator is configured for generating at least one AKA parameter ($RAND_{n+m}$; $RAND_{n+m}$, $AUTN_{n+m}$) enabling authentication and/or key agreement (AKA) for the identified terminal in the network or network node for a subsequent terminal session n+m. The transmitting interface is configured for transmitting the at least one AKA parameter ($RAND_{n+m}$; $RAND_{n+m}$, $AUTN_{n+m}$) destined for the terminal.

The system also comprises a terminal with a receiving interface, a processor and a transmitting interface. The receiving interface is configured for receiving, during the terminal session n, the at least one AKA parameter ($RAND_{n+m}$; $RAND_{n+m}$, $AUTN_{n+m}$) for the subsequent terminal session n+m (e.g. m=1) from the network. The processor is configured for deriving an authentication message ($RES_{n+m}$) and/or a key using the at least one AKA parameter ($RAND_{n+m}$; $RAND_{n+m}$, $AUTN_{n+m}$) received during the terminal session n. The transmitting interface is configured for transmitting, during the subsequent terminal session n+m, the derived authentication message ($RES_{n+m}$) and/or data under the derived key to the network for authentication and/or key agreement for the terminal in the network for the subsequent terminal session n+m.

In the present disclosure, a session is defined as an interactive information exchange between the terminal and the network that is established at a certain time and torn down at a later time. AKA parameters are parameters used for at least one of authentication of the terminal in the network and key agreement between the terminal and the network. These parameters are used for deriving authentication responses and/or keys in the terminal.

By using the AKA parameter(s), obtained in a previous terminal session n by the terminal, in a subsequent terminal session n+m, a separate request of these AKA parameters for authentication and/or key agreement purposes for session n+m can be omitted, thereby improving AKA efficiency. The timeshifted AKA results in that a terminal, when desiring to attach to the network, has immediate access to the AKA parameters or to stored authentication messages and/or keys derived from these AKA parameters, and may immediately send the authentication message to the network. The AKA parameter(s) may be included in a (signaling) message from the network to terminate the previous terminal session n and the authentication message may be included in a (signaling) message from the terminal for initiating the subsequent terminal session n+m.

It should be appreciated that, generally, any step during terminal session n may be used to provide the terminal with the AKA parameter(s) applicable for authentication and/or key agreement purposes for a subsequent terminal session n+m.

In the present disclosure, the authentication messages RES are typically authentication response messages, responding to a challenge (RAND). These messages typically comprise or consist of a code.

An exemplary embodiment involves receiving a first authentication request from the terminal containing a first authentication message ($RES_n$) derived in the terminal using the secret key $K_i$ and at least one first authentication parameter ($RAND_n$) for first terminal session n and transferring at least one second authentication parameter ($RAND_{n+m}$) to the terminal during the first terminal session n. The at least one second authentication parameter ($RAND_{n+m}$) enables the terminal to derive a second authentication message ($RES_{n+m}$) and, optionally, store the second authentication parameter. When the terminal establishes a terminal session n+m, subsequent in time to the first terminal session n, the network receives a second authentication request from the terminal for this subsequent terminal session. The second authentication request then contains the second authentication message ($RES_{n+m}$) and the network is configured for authenticating the terminal for the subsequent terminal session without first needing to supply the second authentication parameter ($RAND_{n+m}$).

An embodiment of the invention involves receiving an attach request from the terminal at the network for the subsequent terminal session n+m, wherein the attach request contains an application message (UD) destined for an application server in or connected to the network and an authentication message ($RES_{n+m}$), derived at the terminal using the at least one AKA parameter ($RAND_{n+m}$; $RAND_{n+m}$, $AUTN_{n+m}$)

received during the terminal session n. The embodiment equally involves at the terminal side the step of transmitting an attach request to the network for the subsequent terminal session n+m, wherein the attach request contains an application message (UD) destined for an application server in or connected to the network and an authentication message ($RES_{n+m}$), derived at the terminal using the at least one AKA parameter ($RAND_{n+m}$; $RAND_{n+m}$, $AUTN_{n+m}$) received during the terminal session n.

These embodiments are specifically advantageous for M2M applications, wherein the application data and the authentication message are both contained in the attach request. The attach request allows authentication of the terminal in the network at a particular node and transmission of the application data without requiring establishing a connection, such as a PDP context. The attach request from the terminal may be rejected by the network, while still allowing user data to be transferred from the terminal to the network in the attach request, thereby saving terminal and network resources. The inclusion of application of application data in an attach request is described in non-pre-published European patent application EP 08018761 of the present applicant.

While conventionally, encryption of data is only provided after authentication of a terminal, an embodiment of the invention involves the step of receiving the application data (UD) at the network in encrypted form during the subsequent terminal session n+m, wherein the encrypted form is obtained at the terminal by encrypting the application message using at least one key ($Kc_{n+m}$; $CK_{n+m}$; $K_{NASenc_{n+m}}$) derived using at least the at least one AKA parameter ($RAND_{n+m}$) received during the terminal session n. Equally, at the terminal side, the embodiment involves the step of encrypting the application message transmitted with the attach request of subsequent terminal session n+m using at least one key ($Kc_{n+m}$; $CK_{n+m}$; $K_{NASenc_{n+m}}$) derived using at least the at least one authentication parameter ($RAND_{n+m}$) received during the terminal session n.

These embodiment allow the encryption of user data (the application message) before authentication of the terminal with the network, thereby improving security of the data transfer. The application message can be decrypted at a node in the network having access to the encryption algorithm and the one or more encryption keys. The application data may also be decrypted at the application server.

In an embodiment of the invention, the method at the network side further involves the step of receiving an attach request from the terminal at the network for the subsequent terminal session n+m, wherein the attach request contains a message authentication code (MAC) for the integrity protection of at least a portion of the attach request message, the MAC being obtained at the terminal by using a cryptographic MAC algorithm and at least one key ($Kc_{n+m}$; $IK_{n+m}$; $K_{NASint_{n+m}}$) derived using at least the at least one AKA parameter ($RAND_{n+m}$) received during the terminal session n. Equally, the method at the terminal side involves the step of generating a message authentication code (MAC) for integrity protection of at least a portion of an attach request message for terminal session n+m using at least one key ($Kc_{n+m}$; $IK_{n+m}$; $K_{NASint_{n+m}}$) derived using at least the at least one AKA parameter ($RAND_{n+m}$) received during the terminal session n and transmitting the message authentication code to the network in the attach request.

These embodiments allow for integrity protection of the entire attach request message or only of the user data (the application message) for a terminal session n+m. After having received the AKA parameter(s) during the terminal session n, a key can be derived for generating a Message Authentication Code (MAC) to be transmitted during terminal session n+m without first having to perform an AKA procedure for terminal session n+m. Integrity protection is typically applied for verifying the correctness of the message and the source of the message. Verification of the Message Authentication Code can be performed in the network or in the application server, dependent on the availability of the encryption key(s) and the applied MAC algorithm(s).

In an embodiment of the invention, the method at the network side involves the step of transferring, during terminal session n, the at least one AKA parameter ($RAND_{n+m}$; $RAND_{n+m}$, $AUTH_{n+m}$) from the network to the terminal in encrypted form. Equally, the method at the terminal side involves the steps of:

receiving, during terminal session n, the at least one AKA parameter ($RAND_{n+m}$; $RAND_{n+m}$, $AUTH_{n+m}$) from the network to the terminal in encrypted form; and decrypting the at least one encrypted AKA parameter ($RAND_{n+m}$; $RAND_{n+m}$ $AUTH_{n+m}$) for deriving an authentication message ($RES_{n+m}$).

Since the time interval between terminal session n and the subsequent terminal session n+m may be considerable, interception of the AKA parameter(s) and subsequent use of these parameters to derive authentication messages and/or keys may be performed. While the use of appropriate authentication and key generation algorithms may delay the derivation of the authentication messages and/or key by unauthorized parties, the encryption of the AKA parameter(s) according to these embodiments may be advantageous to prevent sniffing. The network node configured for encrypting the AKA parameter(s) for the subsequent terminal session has access to the encryption key for the current terminal session and the encryption algorithm.

In an embodiment of the invention, the network node is further configured for transmitting at least one of an expected authentication message ($XRES_n$), at least one encryption/decryption key ($Kc_n$; $IK_n$, $CK_n$; $K_{ASME_n}$) to a further network node for the terminal session n combined with the at least one AKA parameter ($RAND_{n+m}$; $RAND_{n+m}$, $AUTN_{n+m}$) for the subsequent terminal session n+m. The embodiment allows the network to authenticate the terminal in the network for terminal session n and to provide the AKA parameter(s) to the terminal for subsequent terminal session n+m.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
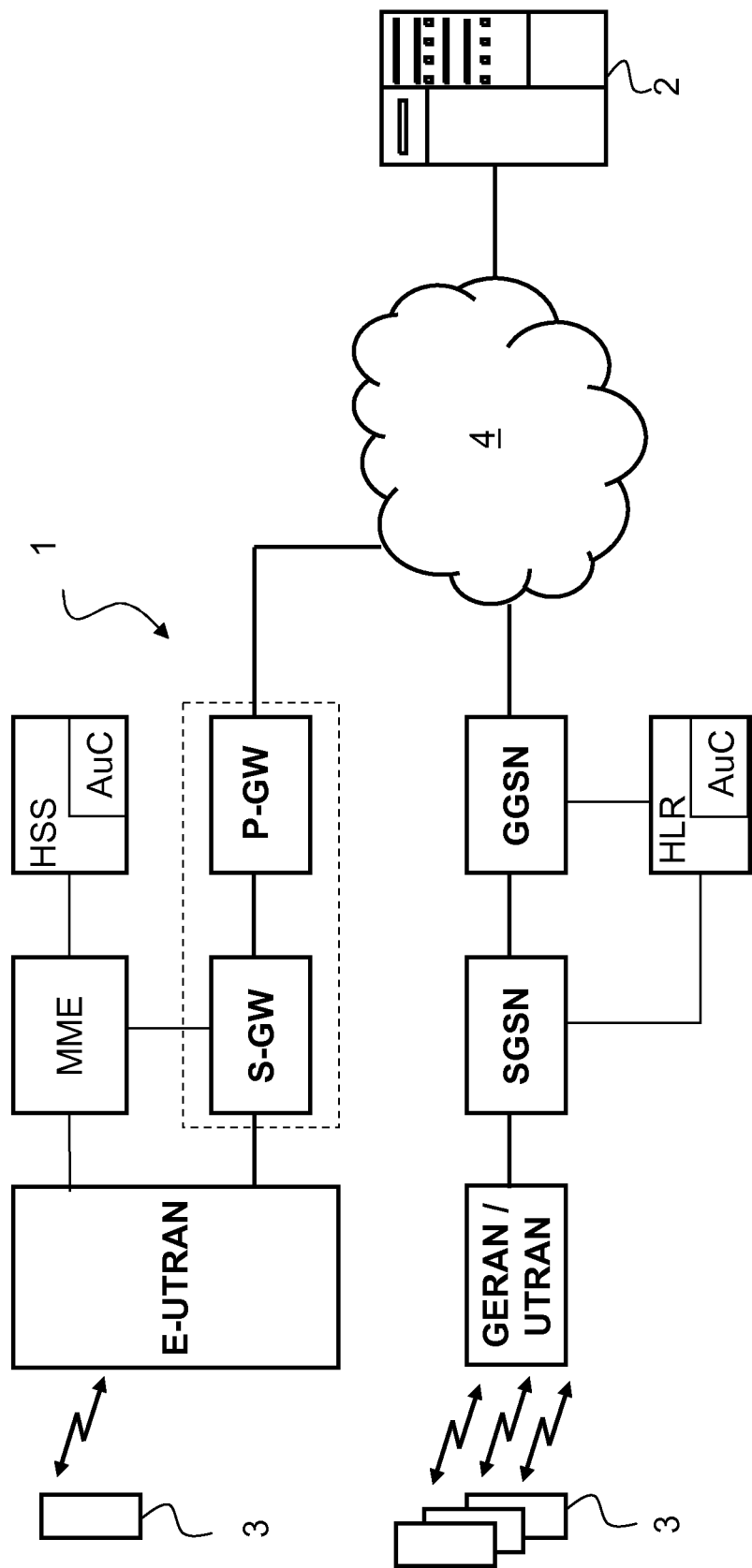
FIG. 1 is a schematic illustration of a telecommunications network connecting terminals to an application server.

FIG. 1 shows a schematic illustration of a telecommunications network 1. The telecommunications network 1 allows data sessions between an application server 2 and a terminal 3 over a data network 4, wherein access of the terminal 3 to the telecommunications network 1 is wireless.

In the telecommunications network of FIG. 1, three generations of telecommunications networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network comprising a Gateway GPRS Support Node (GGSN), a Serving GPRS Support Node (SGSN) and a Radio Access Network (GERAN or UTRAN). For a GSM/EDGE radio access network (GERAN), the RAN comprises a Base Station Controller (BSC) connected to a plurality of Base Station Transceivers (BTSs), both not shown. For a UMTS radio access network (UTRAN), the RAN comprises a Radio Network Controller (RNC) connected to a plurality of NodeBs), also not shown. The GGSN and the SGSN are conventionally connected to a Home Location Register (HLR) that contains subscription information of the terminals 3. In the figure, the HLR is combined with an authentication centre (AuC) for authenticating terminals 3 in the network.

The upper branch in FIG. 1 represents a next generation telecommunications network, commonly indicated as Long Term Evolution (LTE) or Evolved Packet System (EPS). Such a network comprises a PDN Gateway (P-GW) and a Serving Gateway (S-GW). The E-UTRAN of the EPS comprises evolved NodeBs (eNodeBs or eNBs) providing wireless access for a terminal 3 that is connected to the S-GW via a packet network. The S-GW is connected to a Home Subscriber Server HSS and a Mobility Management Entity MME for signalling purposes. The HSS includes a subscription profile repository and an authentication centre (AuC).

Further information of the general architecture of a EPS network can be found in 3GPP TS 23.401.

In an M2M environment, a single server 2 normally is used for communication with a large number of terminals 3. Individual terminals 3 can be identified by individual identifiers, such as an IP address, an IMSI or another terminal identifier.

Embodiments of the invention will now be described in further detail for 2G, 3G and 4G wireless access networks. In these embodiments, it will succeeding terminal sessions n−1, n, n+1 will be considered. The present disclosure, however, is equally applicable for terminal sessions n−m, n, n+m, for terminal sessions n−k, n, n+m or more advanced sequences of terminal sessions as long as at least one AKA parameter received during a previous terminal session can be used for future terminal sessions.

Figures 2A, 2B:
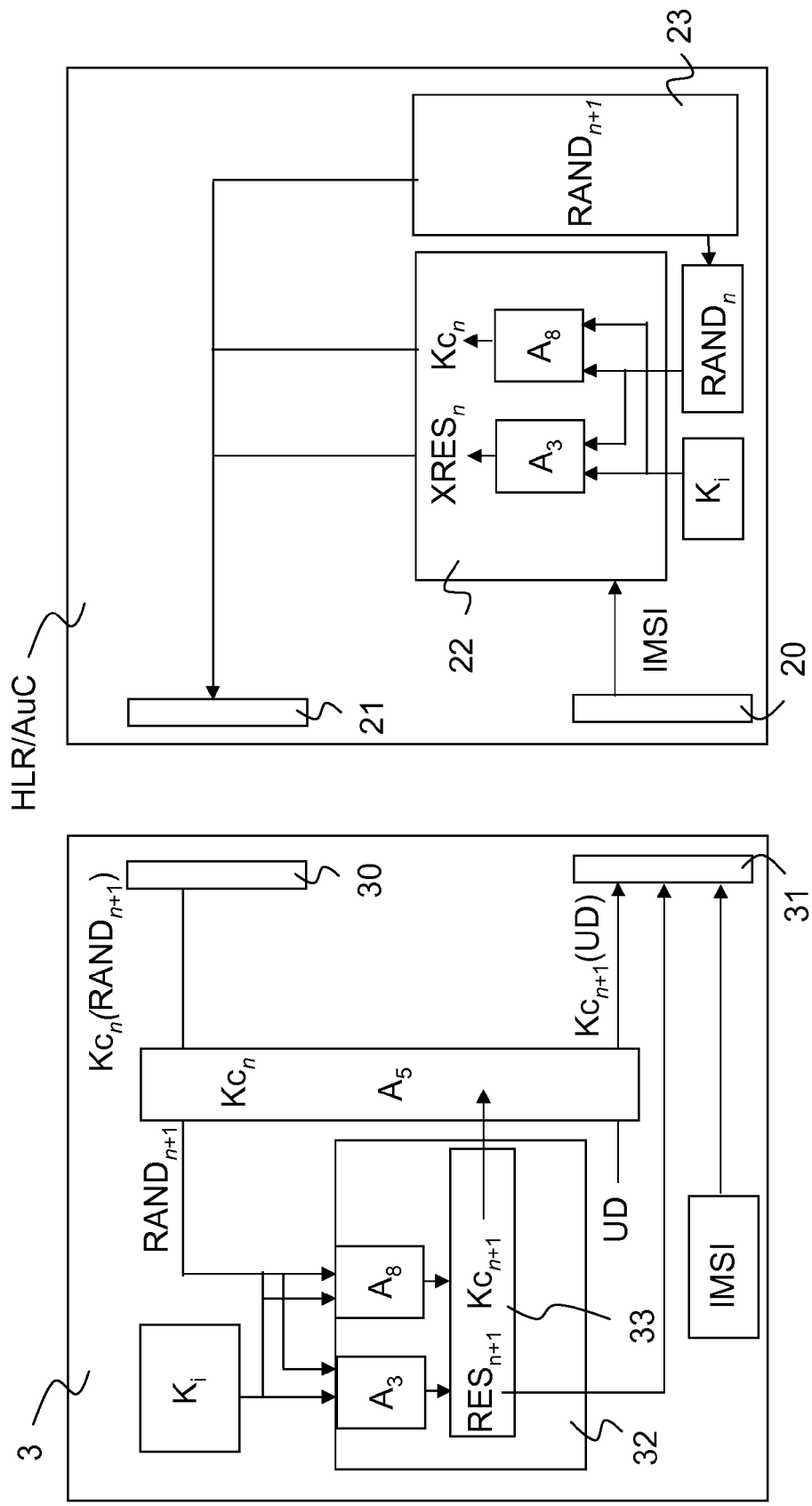
FIGS. 2A and 2B are schematic illustrations of a terminal 3 and a HLR/AuC of a 2G network according to an embodiment of the invention.

FIGS. 2A and 2B are schematic illustrations of a terminal 3 and a HLR/AuC of a 2G network according to an embodiment of the invention.

The HLR/AuC comprises a receiving interface 20 and a transmitting interface 21. Receiving interface 20 is configured for receiving an authentication request from a terminal 3 when setting up a terminal session n. The authentication request contains at least the subscriber identifier, IMSI (International Mobile Subscriber Identity) stored in the SIM. The subscript n for IMSI in FIG. 2B is indicative of the illustrated terminal session but, generally, the IMSI will be the same as for a previous terminal session n−1 and a subsequent terminal session n+1.

HLR/AuC comprises a secret key $K_i$ and a random number RAND, for the terminal 3, the latter usually being different for each terminal session n. Secret key $K_i$ and random number RAND, are used in combination with authentication algorithm $A_3$ and key generation algorithm $A_8$ to derive an expected authentication message XRES, and encryption key $Kc_n$ using processor 22 in a manner known per se. In addition, however, the authentication request also results in the generation of a random number $RAND_{n+1}$ by generator 23. $RAND_{n+1}$ may also be used to derive expected authentication response message $XRES_{n+1}$ and encryption key $Kc_{n+1}$ in advance, i.e. before the request for a subsequent terminal session n+1 is received. $XRES_{n+1}$ and encryption key $Kc_{n+1}$ may then be stored in a storage (not shown). The HLR/AuC is configured for transmitting the triplet of AKA parameters [$RAND_{n+1}$, $XRES_n$, $Kc_n$] via transmitting interface 21 to a further network node, e.g. the SGSN of FIG. 1.

It should be noted that not all components of the triplet are destined for the terminal 3. At the SGSN (see FIG. 1), the components of the triplet received from the HLR/AuC are processed. $XRES_n$ is used for authenticating the terminal 3 in the network for terminal session n, whereas encryption key $Kc_n$ may be used for decrypting user data UD received at the SGSN during terminal session n. The encryption key $Kc_n$ can, however, also be used for encrypting $RAND_{n+1}$, after which encrypted $RAND_{n+1}$ can be forwarded to the terminal 3 over the radio access network RAN. Encryption and decryption can be performed using encryption algorithm $A_5$ in combination with encryption key $Kc_n$.

Terminal 3 comprises a receiving interface 30 and a transmitting interface 31. At some stage during terminal session n, receiving interface 30 receives AKA parameter $RAND_{n+1}$, possibly encrypted using encryption algorithm $A_5$ and encryption key $Kc_n$. Encryption algorithm $A_5$ is known and encryption key $Kc_n$ is derived at the terminal 3, enabling terminal 3 to decrypt the AKA parameter $RAND_{n+1}$.

AKA parameter $RAND_{n+1}$ enables terminal 3, using processor 32, to derive an authentication message $RES_{n+1}$ and an encryption key $Kc_{n+1}$ for a subsequent terminal session n+1, using authentication algorithm $A_3$ and key generation algorithm $A_8$, at an arbitrary time after having terminated terminal session n and without first having to request $RAND_{n+1}$ from the network 1 for the subsequent terminal session n+1. Authentication message $RES_{n+1}$ and an encryption key $Kc_{n+1}$ may be temporarily stored in storage 33 at the terminal 3. User data UD, to be transmitted during the subsequent terminal session n+1, can be encrypted using $Kc_{n+1}$ and encryption algorithm $A_5$. When initiating the subsequent terminal session n+1, transmitting interface 31 may be used for transmitting the IMSI (having subscript n+1 in FIG. 2A to indicate the subsequent terminal session; generally $IMSI_{n+1}$ is equal to $IMSI_n$), the authentication message $RES_{n+1}$ and, optionally, the encrypted user data UD destined for the application server 2.

It should be acknowledged that similar embodiments can be envisaged by a skilled person for 3G/4G terminals and 3G/4G network nodes on the basis of FIGS. 2A and 2B and the above explanation.

While in the present description of the embodiments, the procedure involves both authentication and key agreement, it should be acknowledged that the invention is also applicable for either authentication or key agreement individually.

FIGS. 3A-3D provide schematic illustrations of authentication and key agreement (AKA) procedures for a 2G telecommunications network 1 according to embodiments of the invention.

Figure 3A:
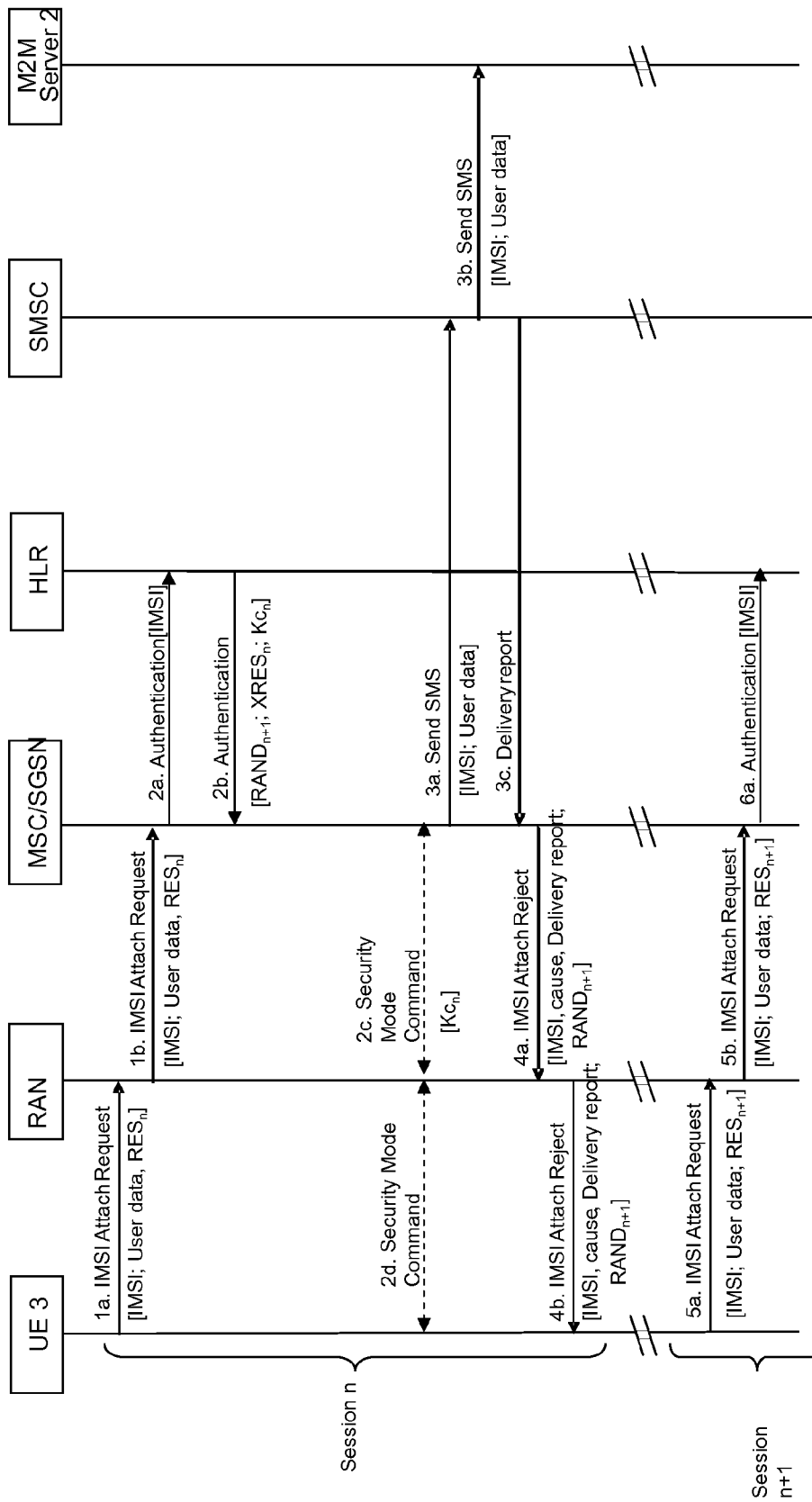
FIGS. 3A-3D provide schematic illustrations of AKA procedures for a 2G telecommunications network according to embodiments of the invention.

FIG. 3A is a schematic illustration of an AKA procedure wherein user data UD is transferred in signalling messages from a terminal UE 3 to a network 1.

In step 1a, terminal UE 3 transmits an attach request containing at least one of, or all of, the terminal identifier IMSI, application message UD, or an authentication message $RES_n$, using for example transmitting interface 31, in order to request a terminal session n. The authentication message $RES_n$ may be a 32-bit message. $RES_n$ is e.g. obtained by a previous execution of the embodiment of the invention, as will be further explained with reference to FIG. 6. The attach request can be wirelessly received at the RAN of FIG. 1 and forwarded to the MSC/SGSN in step 1b.

In step 2a, the MSC/SGSN issues an authentication request to the HLR, the authentication request containing the IMSI of UE 3. The authentication request is received via receiving interface 20 at the HLR. The HLR retrieves expected authentication response message $XRES_n$ and encryption key $Kc_n$ and furthermore generates an AKA parameter $RAND_{n+1}$ for AKA purposes for a subsequent terminal session n+1, using generator 23, by the same terminal UE 3. $RAND_{n+1}$ may be a 128-bit message. The HLR may already calculate $XRES_{n+1}$ and $Kc_{n+1}$ for the subsequent terminal session n+1 and store these parameters. In step 2b, the HLR reports the triplet [$RAND_{n+1}$, $XRES_n$, $Kc_n$] to the MSC/SGSN. At the MSC/SGSN, the authentication of the terminal 3 in the network 1 for terminal session n can be processed by comparing $RES_n$, received in step 1b, with $XRES_n$ of the triplet received in step 2b. If the authentication is successful, the terminal UE 3 and the network may switch to a security mode (steps 2c, 2d), wherein it is agreed that all further communication is performed under encryption key $Kc_n$.

The user data UD, received in step 1b, may then be forwarded to M2M server 2. In the embodiment shown in FIG. 3A, this is done using SMS messages via steps 3a, 3b, but other methods of forwarding the user data from the MSC/SGSN to the application server 2 may be applied. In the present embodiment, again optionally, a delivery message confirming receipt of the user data at the application server 2 is received in step 3c at the MSC/SGSN.

Since the user data is already included in the signalling message, i.e. the IMSI Attach Request in the present embodiment, it is not necessary to establish a full data connection between the terminal UE 3 and the network 1. Therefore, in steps 4a and 4b, an IMSI Attach Reject message is forwarded to the terminal UE 3 from the network 1 to avoid establishing a full connection and, consequently, save network resources. The IMSI Attach Reject message contains, however, the AKA parameter $RAND_{n+1}$ that is received by the terminal UE 3 via receiving interface 30 as the final step of the terminal session n.

As explained with reference to FIG. 2A, the AKA parameter $RAND_{n+1}$ can be used for deriving a authentication message $RES_{n+1}$ and/or an encryption key $Kc_{n+1}$ that can be stored in storage 33 for a later terminal session n+1.

Steps 5a, 5b and 6 illustrate the use of $RES_{n+1}$ for a subsequent terminal session n+1 for immediately requesting authentication at the network for this session.

Figure 3B:
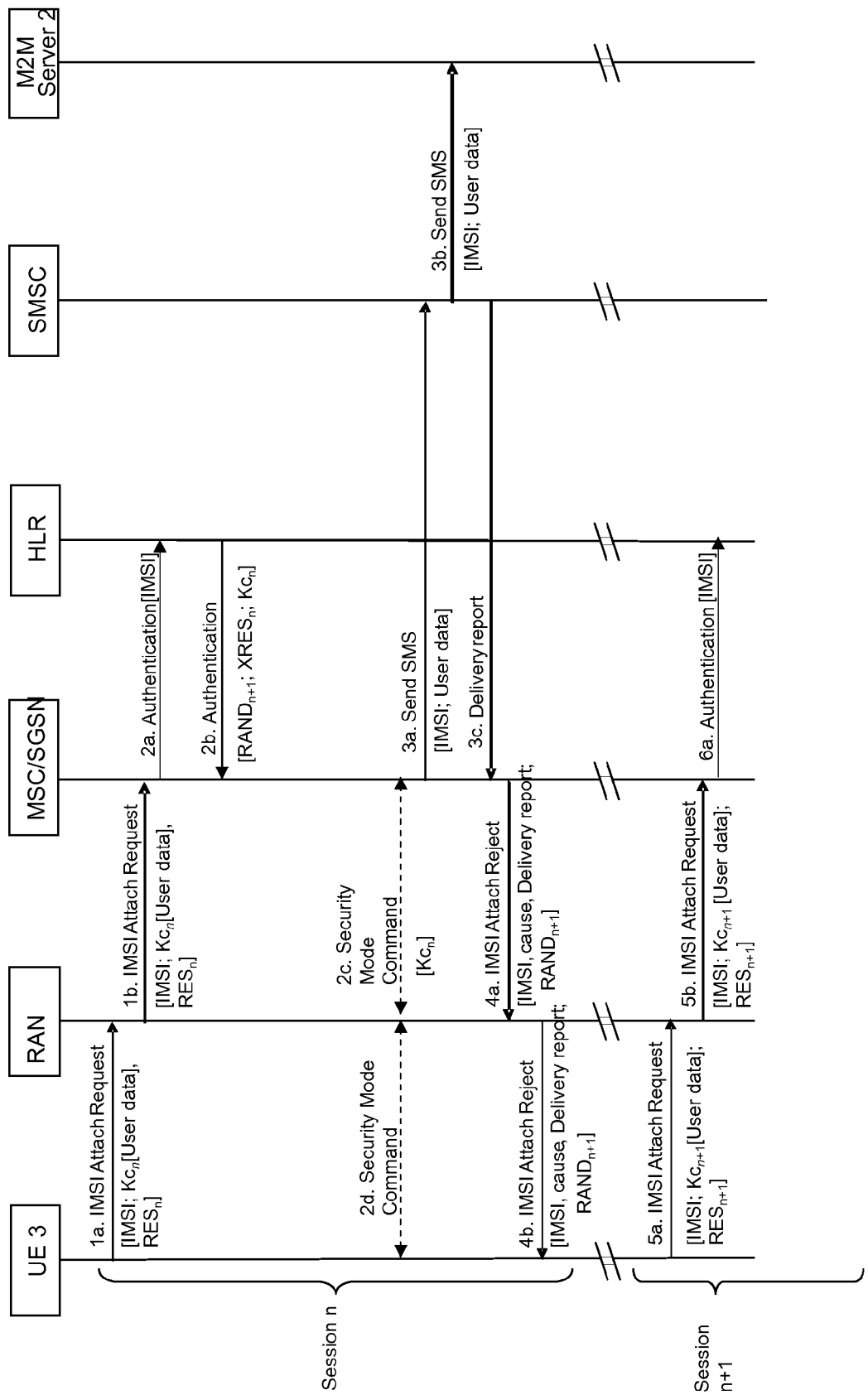

FIG. 3B is a schematic illustration of an AKA procedure wherein user data UD is transferred in signalling messages from a terminal UE 3 to a network 1 in encrypted form.

In step 1a, terminal UE 3 transmits an attach request containing the subscriber identifier IMSI, application message UD and an authentication message $RES_n$, using transmitting interface 31, in order to request a terminal session n. The authentication message $RES_n$ may be a 32-bit message. The user data UD is now encrypted using encryption key $Kc_n$ and encryption algorithm $A_5$ as described with reference to FIG. 2A. The attach request is wirelessly received at the RAN of FIG. 1 and forwarded to the MSC/SGSN in step 1b.

In step 2a, the MSC/SGSN issues an authentication request to the HLR, the authentication request containing the IMSI of terminal UE 3. The authentication request is received via receiving interface 20 at the HLR. The HLR retrieves expected authentication response message $XRES_n$ and encryption key $Kc_n$ and furthermore generates an AKA parameter $RAND_{n+1}$ for AKA purposes for a subsequent terminal session n+1, using generator 23, by the same terminal UE 3. $RAND_{n+1}$ may be a 128-bit message. The HLR may already calculate $XRES_{n+1}$ and $Kc_{n+1}$ for the subsequent terminal session n+1 and store these parameters. In step 2b, the HLR reports the triplet [$RAND_{n+1}$, $XRES_n$, $Kc_n$] to the MSC/SGSN.

At the MSC/SGSN, the authentication of the terminal 3 in the network 1 for terminal session n can be processed by comparing $RES_n$, received in step 1b, with $XRES_n$ of the triplet received in step 2b. If the authentication is successful, the terminal UE 3 and the network may switch to a security mode (steps 2c, 2d), wherein it is agreed that all further communication is performed under encryption key $Kc_n$.

The application message UD, received in step 1b, may then be forwarded to M2M server 2. In the embodiment shown in FIG. 3A, this is done using SMS messages via steps 3a, 3b, but other methods of forwarding the user data from the MSC/SGSN to the application server 2 may be applied. In the present embodiment, again optionally, a delivery message confirming receipt of the user data at the application server 2 is received in step 3c at the MSC/SGSN. Furthermore, the application message UD is decrypted using the encryption key $Kc_n$ and the encryption algorithm $A_5$ known at the MSC/SGSN. Alternatively, the application message UD is forwarded towards the application server 2 in encrypted form and decrypted at a further network node or the application server 2 having access to encryption key $Kc_n$ and encryption algorithm $A_5$.

Again, since the application message UD is already included in the signalling message, i.e. the IMSI Attach Request in the present embodiment, it is not necessary to establish a full data connection between the terminal UE 3 and the network 1. Therefore, in steps 4a and 4b, an IMSI Attach Reject message is forwarded to the terminal UE 3 from the network 1 to avoid establishing a full connection and, consequently, save network resources. The IMSI Attach Reject message contains, however, the AKA parameter $RAND_{n+1}$ that is received by the terminal UE 3 via receiving interface 30 as the final step of the terminal session n.

As explained with reference to FIG. 2A, the AKA parameter $RAND_{n+1}$ can be used for deriving an authentication message $RES_{n+1}$ and/or an encryption key $Kc_{n+1}$ that can be stored in storage 33 for a later terminal session n+1.

Steps 5a, 5b and 6 illustrate the use of $RES_{n+1}$ for a subsequent terminal session n+1 for immediately requesting authentication at the network for this session. The application message UD to be sent in this terminal session may be encrypted using encryption algorithm $A_5$ and encryption key $Kc_{n+1}$, the latter being derived from the AKA parameter $RAND_{n+1}$ received during previous terminal session n, $K_i$ and key generation algorithm $A_8$.

Since the time interval between terminal session n and the subsequent terminal session n+1 may be considerable, interception of the AKA parameter $RAND_{n+1}$ and subsequent use of this parameter to derive authentication message $RES_{n+1}$ and/or key $Kc_{n+1}$ may be performed. While the use of appropriate authentication and key generation algorithms may delay the derivation of the authentication message and/or key by unauthorized parties, the encryption of the AKA parameter $RAND_{n+1}$ may be advantageous to prevent sniffing. Such an embodiment is shown in FIG. 3C.

Figure 3C:
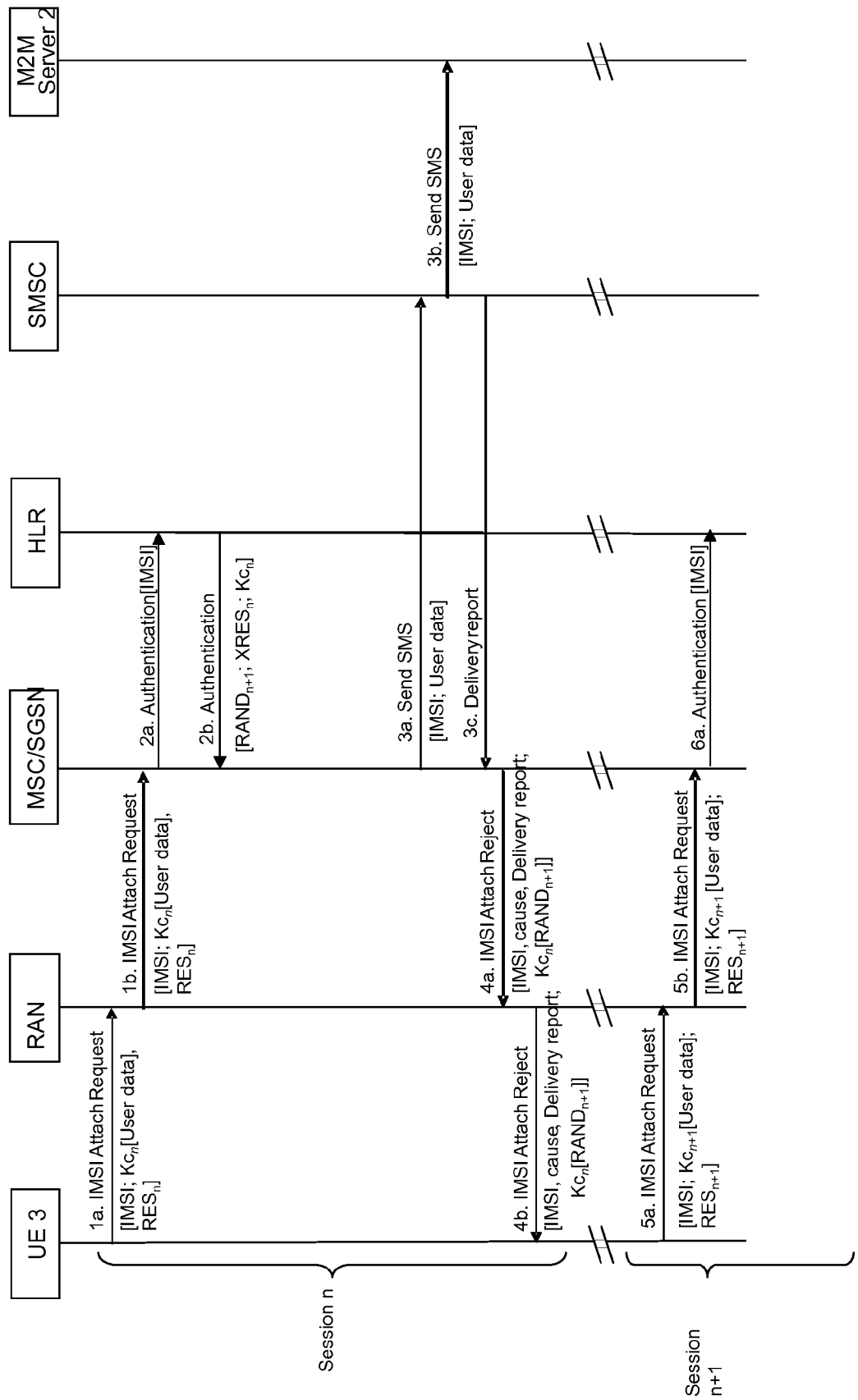

FIG. 3C is a schematic illustration of an AKA procedure wherein user data UD is transferred in signalling messages from a terminal UE 3 to a network 1 in encrypted form and wherein the AKA parameter $RAND_{n+1}$ transferred to terminal UE 3 during terminal session n is also encrypted. It should be appreciated that, while FIG. 3C illustrates the combined option, it is not necessary to encrypt the application message UD when encrypting AKA parameter $RAND_{n+1}$.

In step 1a, terminal UE 3 again transmits an attach request containing the subscriber identifier IMSI, application message UD and an authentication message $RES_n$, using transmitting interface 31, in order to request a terminal session n. The authentication message $RES_n$ may be a 32-bit message. The user data UD may be encrypted using encryption key $Kc_n$ and encryption algorithm $A_5$ as described with reference to FIG. 2A. The attach request is wirelessly received at the RAN of FIG. 1 and forwarded to the MSC/SGSN in step 1b.

In step 2a, the MSC/SGSN issues an authentication request to the HLR, the authentication request containing the IMSI of terminal UE 3. The authentication request is received via receiving interface 20 at the HLR. The HLR retrieves expected authentication response message XRES, and encryption key $Kc_n$ and furthermore generates an AKA parameter $RAND_{n+1}$ for AKA purposes for a subsequent terminal session n+1, using generator 23, by the same terminal UE 3. $RAND_{n+1}$ may be a 128-bit message. The HLR may already calculate $XRES_{n+1}$ and $Kc_{n+1}$ for the subsequent terminal session n+1 and store these parameters. In step 2b, the HLR reports the triplet [$RAND_{n+1}$, $XRES_n$, $Kc_n$] to the MSC/SGSN.

At the MSC/SGSN, the authentication of the terminal 3 in the network 1 for terminal session n can be processed by comparing $RES_n$, received in step 1b, with XRES, of the triplet received in step 2b.

The application message UD, received in step 1b, may then be forwarded to M2M server 2. In the embodiment shown in FIG. 3C, this is done using SMS messages via steps 3a, 3b, but other methods of forwarding the user data from the MSC/SGSN to the application server 2 may be applied. In the present embodiment, again optionally, a delivery message confirming receipt of the user data at the application server 2 is received in step 3c at the MSC/SGSN. Furthermore, when the application message UD is encrypted, the application message UD may be decrypted using the encryption key $Kc_n$ and the encryption algorithm $A_5$ known at the MSC/SGSN. Alternatively, the application message UD is forwarded towards the application server 2 in encrypted form and decrypted at a further network node or the application server 2 having access to encryption key $Kc_n$ and encryption algorithm $A_5$.

Again, since the application message UD is already included in the signalling message, i.e. the IMSI Attach Request in the present embodiment, it is not necessary to establish a full data connection between the terminal UE 3 and the network 1. Therefore, in steps 4a and 4b, an IMSI Attach Reject message is forwarded to the terminal UE 3 from the network 1 to avoid establishing a full connection and, consequently, save network resources. The IMSI Attach Reject message contains, however, the AKA parameter $RAND_{n+1}$ that is received by the terminal UE 3 via receiving interface 30 as the final step of the terminal session n. In the embodiment of FIG. 3C, the AKA parameter $RAND_{n+1}$ is encrypted using encryption key $Kc_n$ from the triplet and encryption algorithm $A_5$ to complicate sniffing this parameter on the wireless air interface.

As explained with reference to FIG. 2A, the AKA parameter $RAND_{n+1}$ can be used for deriving a response authentication message $RES_{n+1}$ and/or an encryption key $Kc_{n+1}$ that can be stored in storage 33 for a later terminal session n+1.

Again, steps 5a, 5b and 6 illustrate the use of $RES_{n+1}$ for a subsequent terminal session n+1 for immediately requesting authentication at the network for this session. The application message UD to be sent in this terminal session may be encrypted using encryption algorithm $A_5$ and encryption key $Kc_{n+1}$, the latter being derived from the AKA parameter $RAND_{n+1}$ received during previous terminal session n, $K_i$ and key generation algorithm $A_8$.

Generally, any step during terminal session n may be used to provide the terminal with the AKA parameter(s) applicable for authentication and/or key agreement purposes for a subsequent terminal session n+1.

In the embodiments of FIGS. 3A-3C, the IMSI Attach Request was rejected for saving resources as the application message was already conveyed to the network with this request. However, according to an embodiment of the invention, the IMSI Attach Request may also be accepted in order to enable transmission from the network to the terminal UE 3.

Figure 3D:
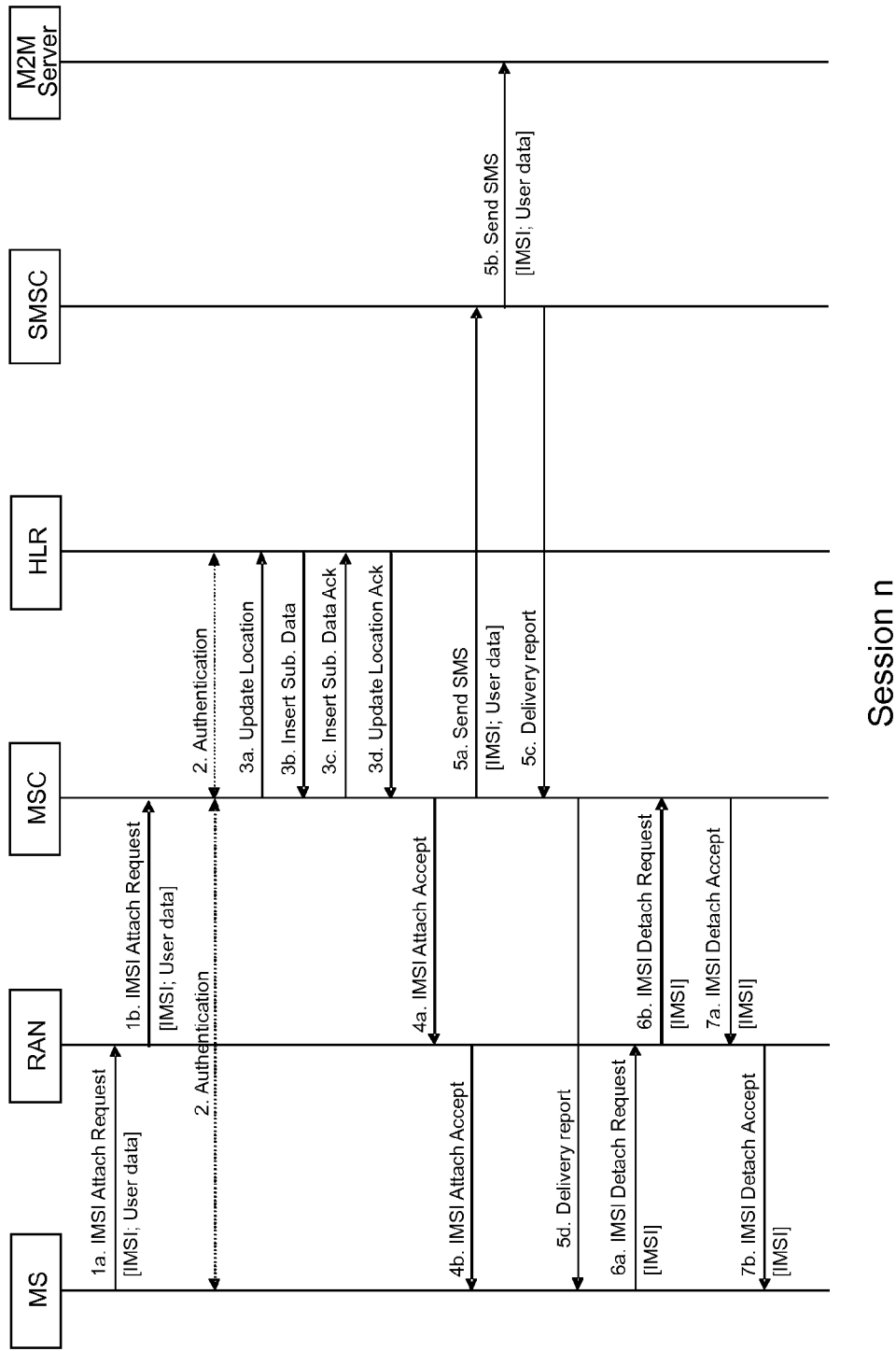

FIG. 3D is an illustration of a terminal session n wherein the IMSI Attach Request is accepted (steps 4a, 4b) in order to send the delivery report acknowledging delivery of the application message UD at the application server 2 in step 5d. The inclusion of the AKA parameter(s) is not shown in FIG. 3D. The terminal UE 3 may, after receipt of the delivery report in step 5d, request detach from the network in step 6a, 6b that is accepted by the network 1 in steps 7a, 7b. The AKA parameter $RAND_{n+1}$ can be transmitted to the terminal UE 3 during steps 4a; 4b, step 5d or steps 7a; 7b.

FIGS. 4A-4D provide schematic illustrations of AKA procedures for a 3G telecommunications network according to embodiments of the invention.

Figure 4A:
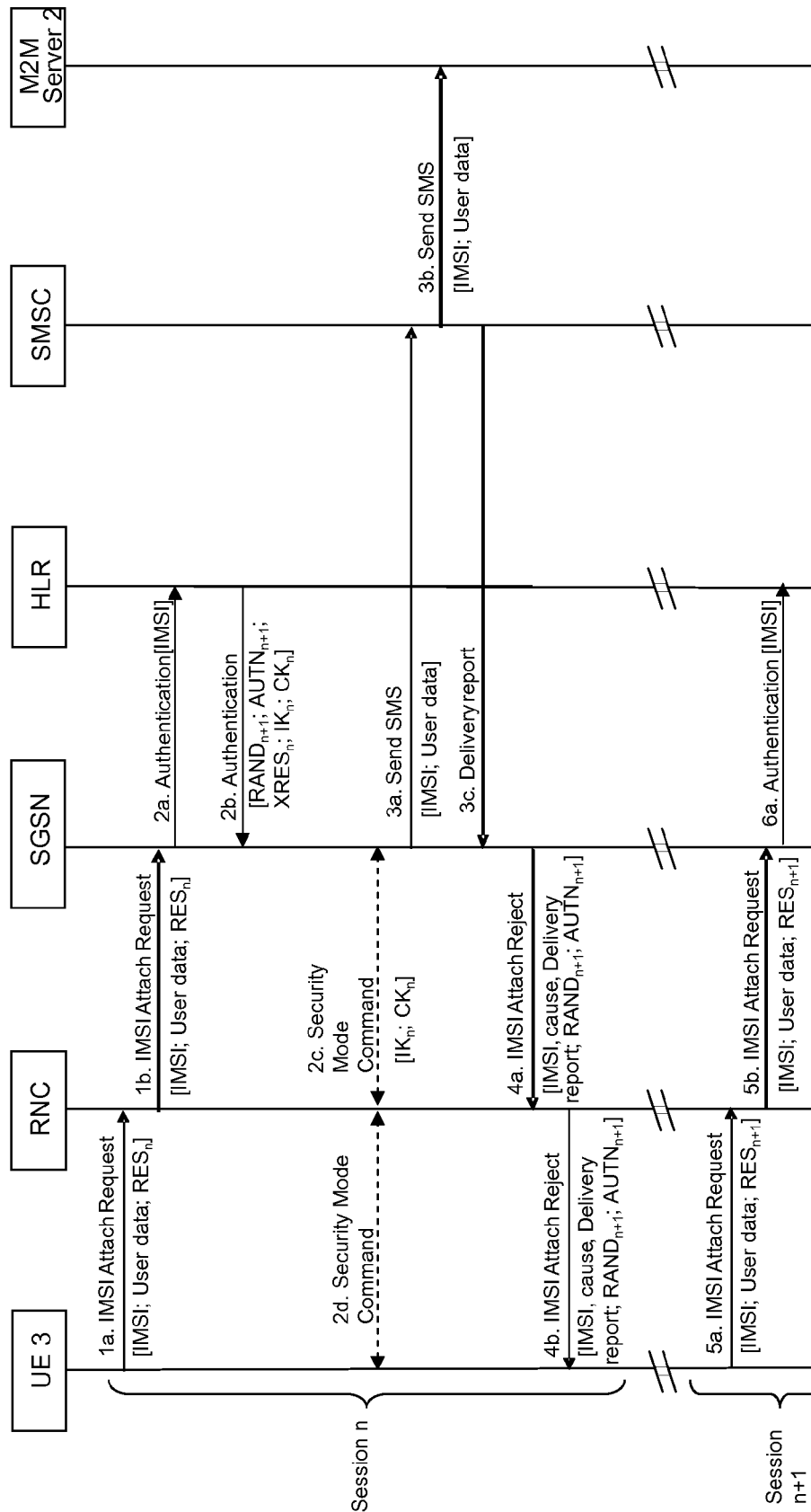
FIGS. 4A-4D provide schematic illustrations of AKA procedures for a 3G telecommunications network according to embodiments of the invention.

FIG. 4A is a schematic illustration of an AKA procedure wherein user data UD is transferred in signalling messages from a terminal UE 3 to a network 1.

In step 1a, terminal UE 3 transmits an attach request containing the subscriber identifier IMSI, application message UD, and an authentication message $RES_n$ in order to request a terminal session n. The authentication message $RES_n$ may be a 128-bit message. $RES_n$ is e.g. obtained by a previous execution of the embodiment of the invention, as will be further explained with reference to FIG. 6. The attach request is forwarded to the RNC of the RAN of FIG. 1 and forwarded to the SGSN in step 1b.

In step 2a, the SGSN issues an authentication request to the HLR, the authentication request containing the IMSI of UE 3. The authentication request is received at the HLR. The HLR retrieves expected authentication response message $XRES_n$ and cryptographic keys $IK_n$ for integrity protection and $CK_n$ for encryption. Furthermore, AKA parameters $RAND_{n+1}$ and $AUTH_{n+1}$ are generated at the HLR for AKA purposes for a subsequent terminal session n+1 by the same terminal UE 3. $RAND_{n+1}$ and $AUTN_{n+1}$ are both 128-bit long. The HLR may already calculate $XRES_{n+1}$ and $IK_{n+1}$ and $CK_{n+1}$ for the subsequent terminal session n+1 and store these parameters. In step 2b, the HLR reports the quintet [$RAND_{n+1}$, $AUTN_{n+1}$, $XRES_n$, $IK_n$, $CK_n$] to the SGSN. At the SGSN, the authentication of the terminal 3 in the network 1 for terminal session n can be processed by comparing $RES_n$, received in step 1b, with $XRES_n$ of the quintet received in step 2b. If the authentication is successful, the terminal UE 3 and the network may switch to a security mode (steps 2c, 2d), wherein it is agreed that all further signalling and data communication is protected using keys $IK_n$ and $CK_n$, respectively.

The user data UD, received in step 1b, may then be forwarded to M2M server 2. In the embodiment shown in FIG. 4A, this is done using SMS messages via steps 3a, 3b, but other methods of forwarding the user data from the SGSN to the application server 2 may be applied. In the present embodiment, again optionally, a delivery message confirming receipt of the user data at the application server 2 is received in step 3c at the SGSN.

Since the user data is already included in the signalling message, i.e. the IMSI Attach Request in the present embodiment, it is not necessary to establish a full data connection between the terminal UE 3 and the network 1. Therefore, in steps 4a and 4b, an IMSI Attach Reject message is forwarded to the terminal UE 3 from the network 1 to avoid establishing a full connection and, consequently, save network resources. The IMSI Attach Reject message contains, however, the AKA parameters $RAND_{n+1}$ and $AUTN_{n+1}$ that are received by the terminal UE 3 as the final step of the terminal session n.

The AKA parameter $RAND_{n+1}$ can be used for deriving a response authentication message $RES_{n+1}$ and/or keys $IK_{n+1}$ and $CK_{n+1}$ that can be stored for a later terminal session n+1. $AUTN_{n+1}$ is used for network authentication of a subsequent terminal session n+1 to determine that the $RAND_{n+1}$ was received from the correct network.

Steps 5a, 5b and 6 illustrate the use of $RES_{n+1}$ for a subsequent terminal session n+1 for immediately requesting authentication at the network for this session.

Figure 4B:
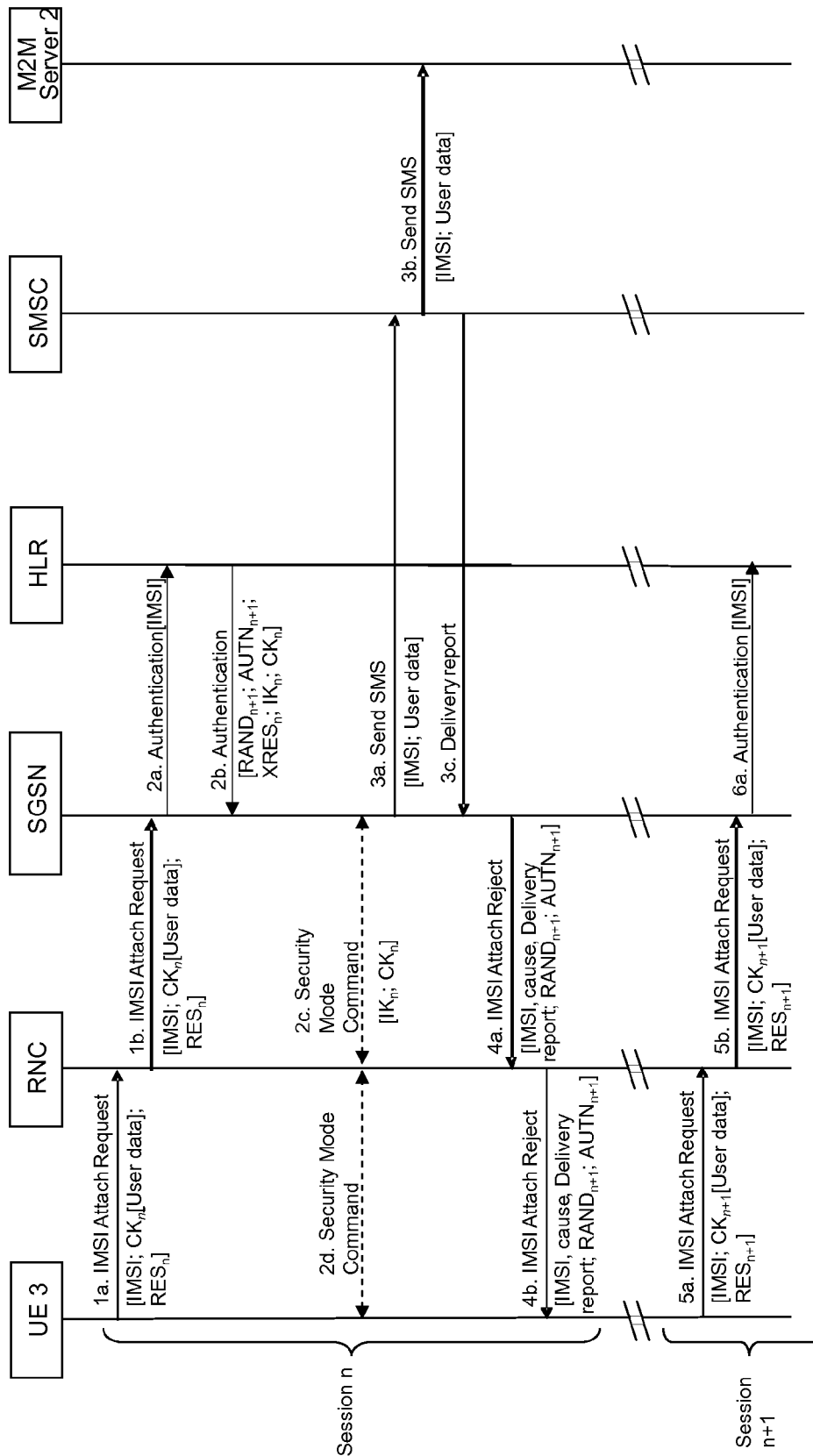

FIG. 4B is a schematic illustration of an AKA procedure wherein user data UD is transferred in signalling messages from a terminal UE 3 to a network 1 in encrypted form.

In step 1a, terminal UE 3 transmits an attach request containing the subscriber identifier IMSI, application message UD, and an authentication message $RES_n$ in order to request a terminal session n. The authentication message $RES_n$ may be a 128-bit message. $RES_n$ is e.g. obtained by a previous execution of the embodiment of the invention, as will be further explained with reference to FIG. 6. The attach request is forwarded to the RNC of the RAN of FIG. 1 and forwarded to the SGSN in step 1b. User data UD is encrypted using encryption key $CK_n$ and a UMTS encryption algorithm (e.g. UEA1 or UEA2).

In step 2a, the SGSN issues an authentication request to the HLR, the authentication request containing the IMSI of UE 3. The authentication request is received at the HLR. The HLR retrieves expected authentication response message $XRES_n$ and encryption keys $IK_n$ for signalling encryption and $CK_n$ for user data encryption. Furthermore, AKA parameters $RAND_{n+1}$ and $AUTH_{n+1}$ are generated at the HLR for AKA purposes for a subsequent terminal session n+1 by the same terminal UE 3. $RAND_{n+1}$ and $AUTN_{n+1}$ are both 128-bit long. The HLR may already calculate $XRES_{n+1}$ and $IK_{n+1}$ and $CK_{n+1}$ for the subsequent terminal session n+1 and store these parameters. In step 2b, the HLR reports the quintet $[RAND_{n+1}, AUTN_{n+1}, XRES_n, IK_n, CK_n]$ to the SGSN. At the SGSN, the authentication of the terminal 3 in the network 1 for terminal session n can be processed by comparing $RES_n$, received in step 1b, with $XRES_n$ of the quintet received in step 2b. If the authentication is successful, the terminal UE 3 and the network may switch to a security mode (steps 2c, 2d), wherein it is agreed that all further signalling and data communication are protected by using keys $IK_n$ and $CK_n$, respectively.

The user data UD, received in step 1b, may then be forwarded to M2M server 2. Either, the user data UD is decrypted at the RNC using encryption key $CK_n$ received in the quintet and an encryption algorithm or the user data is forwarded in encrypted form for decryption at a further network node or application server 2 having access to the encryption key $CK_n$ and the encryption algorithm. In the embodiment shown in FIG. 4B, forwarding of the user data UD is done using SMS messages via steps 3a, 3b, but other methods of forwarding the user data from the SGSN to the application server 2 may be applied. In the present embodiment, again optionally, a delivery message confirming receipt of the user data at the application server 2 is received in step 3c at the SGSN.

Since the user data is already included in the signalling message, i.e. the IMSI Attach Request in the present embodiment, it is not necessary to establish a full data connection between the terminal UE 3 and the network 1. Therefore, in steps 4a and 4b, an IMSI Attach Reject message is forwarded to the terminal UE 3 from the network 1 to avoid establishing a full connection and, consequently, save network resources. The IMSI Attach Reject message contains, however, the AKA parameters $RAND_{n+1}$ and $AUTN_{n+1}$ that are received by the terminal UE 3 as the final step of the terminal session n.

The AKA parameter $RAND_{n+1}$ can be used for deriving a response authentication message $RES_{n+1}$ and/or encryption keys $IK_{n+1}$ and $CK_{n+1}$ that can be stored for a later terminal session n+1. $AUTN_{n+1}$ is used for network authentication of a subsequent terminal session n+1 to determine that the $RAND_{n+1}$ was received from the correct network.

Steps 5a, 5b and 6 illustrate the use of $RES_{n+1}$ for a subsequent terminal session n+1 for immediately requesting authentication at the network for this session. The application message UD to be sent in this terminal session may be encrypted using an encryption algorithm and encryption key $CK_{n+1}$, the latter being derived from the AKA parameter $RAND_{n+1}$ received during previous terminal session n, $K_i$ and a key generation algorithm.

Figure 4C:
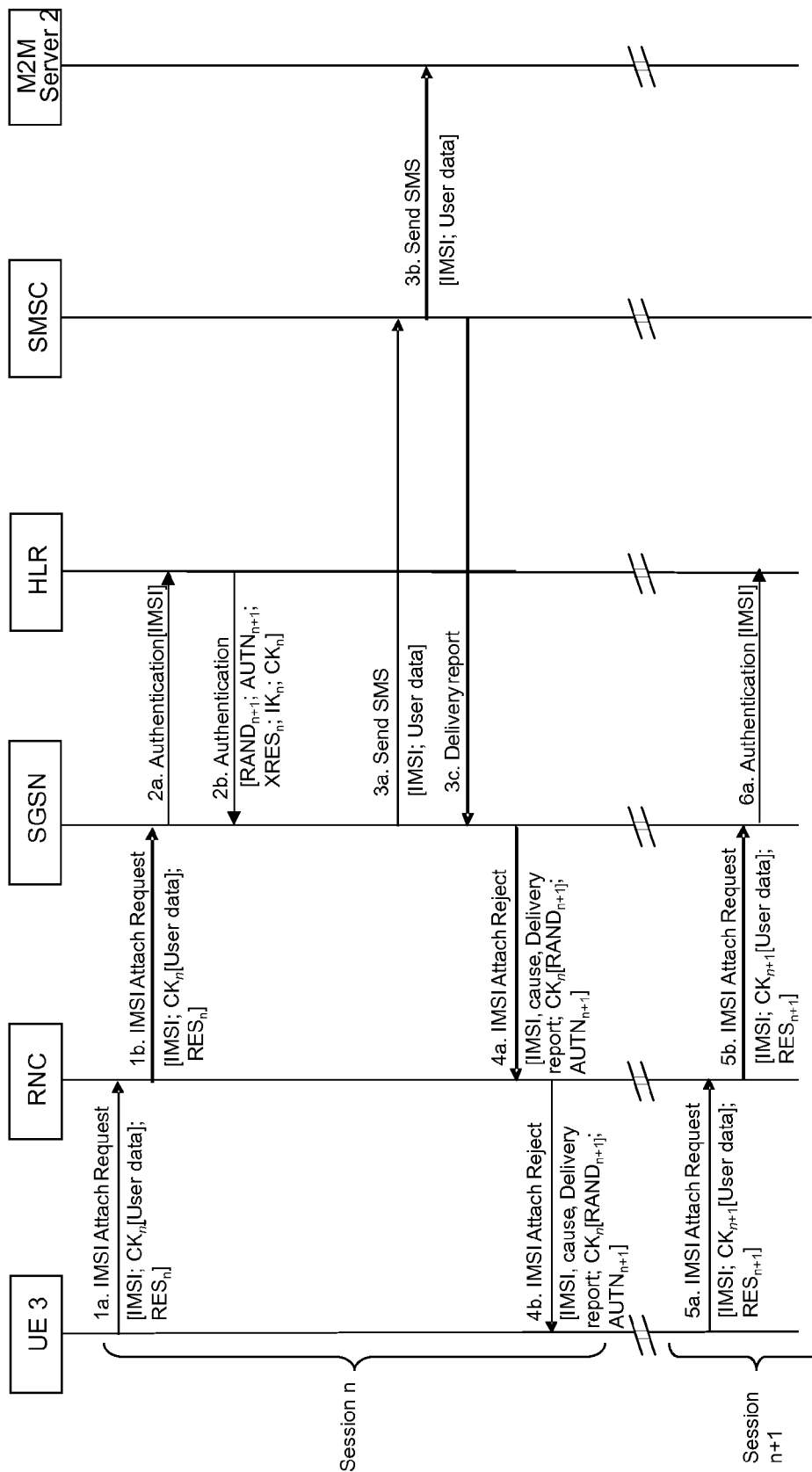

FIG. 4C is a schematic illustration of an AKA procedure wherein user data UD is transferred in signalling messages from a terminal UE 3 to a network 1 in encrypted form and wherein the AKA parameters $RAND_{n+1}$ and $AUTN_{n+1}$ are transferred to terminal UE 3 during terminal session n is also encrypted. It should be appreciated that, while FIG. 4C illustrates the combined option, it is not necessary to encrypt the application message UD when encrypting AKA parameter $RAND_{n+1}$.

In step 1a, terminal UE 3 transmits an attach request containing the subscriber identifier IMSI, application message UD, and an authentication message $RES_n$ in order to request a terminal session n. The authentication message $RES_n$ may be a 128-bit message. $RES_n$ is e.g. obtained by a previous execution of the embodiment of the invention, as will be further explained with reference to FIG. 6. The attach request is forwarded to the RNC of the RAN of FIG. 1 and forwarded to the SGSN in step 1b. User data UD may be encrypted using encryption key $CK_n$ and encryption algorithm $A_5$.

In step 2a, the SGSN issues an authentication request to the HLR, the authentication request containing the IMSI of UE 3. The authentication request is received at the HLR. The HLR retrieves expected authentication response message $XRES_n$ and encryption keys IK, for signalling encryption and $CK_n$ for user data encryption. Furthermore, AKA parameters $RAND_{n+1}$ and $AUTH_{n+1}$ are generated at the HLR for AKA purposes for a subsequent terminal session n+1 by the same terminal UE 3. $RAND_{n+1}$ and $AUTN_{n+1}$ are both 128-bit long. The HLR may already calculate $XRES_{n+1}$ and $IK_{n+1}$ and $CK_{n+1}$ for the subsequent terminal session n+1 and store these parameters. In step 2b, the HLR reports the quintet [$RAND_{n+1}$ $AUTN_{n+1}$, $XRES_n$, $IK_n$, $CK_n$] to the SGSN. At the SGSN, the authentication of the terminal 3 in the network 1 for terminal session n can be processed by comparing $RES_n$, received in step 1b, with $XRES_n$ of the quintet received in step 2b.

The user data UD, received in step 1b, may then be forwarded to M2M server 2. When the user data is encrypted, the user data UD may decrypted either at the RNC using encryption key $CK_n$ received in the quintet and an UMTS encryption algorithm or the user data is forwarded in encrypted form for decryption at a further network node or application server 2 having access to the encryption key $CK_n$ and the encryption algorithm. In the embodiment shown in FIG. 4C, forwarding of the user data UD is done using SMS messages via steps 3a, 3b, but other methods of forwarding the user data from the SGSN to the application server 2 may be applied. In the present embodiment, again optionally, a delivery message confirming receipt of the user data at the application server 2 is received in step 3c at the SGSN.

Since the user data is already included in the signalling message, i.e. the IMSI Attach Request in the present embodiment, it is not necessary to establish a full data connection between the terminal UE 3 and the network 1. Therefore, in steps 4a and 4b, an IMSI Attach Reject message is forwarded to the terminal UE 3 from the network 1 to avoid establishing a full connection and, consequently, save network resources. The IMSI Attach Reject message contains, however, the AKA parameters $RAND_{n+1}$ and $AUTN_{n+1}$ that are received by the terminal UE 3 as the final step of the terminal session n. In the embodiment of FIG. 4C, the AKA parameters $RAND_{n+1}$ and $AUTN_{n+1}$ are encrypted using encryption key $CK_n$ from the quintet received in step 2b and an encryption algorithm to complicate sniffing of these parameter on the wireless air interface.

The AKA parameter $RAND_{n+1}$ can be used for deriving an authentication message $RES_{n+1}$ and/or cryptographic keys $IK_{n+1}$ and $CK_{n+1}$ that can be stored for a later terminal session n+1. $AUTN_{n+1}$ is used for network authentication of a subsequent terminal session n+1 to determine that the $RAND_{n+1}$ was received from the correct network.

Steps 5a, 5b and 6 illustrate the use of $RES_{n+1}$ for a subsequent terminal session n+1 for immediately requesting authentication at the network for this session. The application message UD to be sent in this terminal session may be encrypted using an encryption algorithm and encryption key $CK_{n+1}$, the latter being derived from the AKA parameter $RAND_{n+1}$ received during previous terminal session n, $K_i$ and a key generation algorithm.

It should be appreciated that, as described previously for 2G networks with reference to FIG. 3D, it is not required to reject the IMSI Attach Request for terminal session n and to provide the AKA parameters for the subsequent terminal session n+1 with the IMSI Attach Reject. The connection for terminal session n may be established and, during any of the steps of this session, the AKA parameters may be forwarded from the network 1 to the terminal UE 3.

Figure 4D:
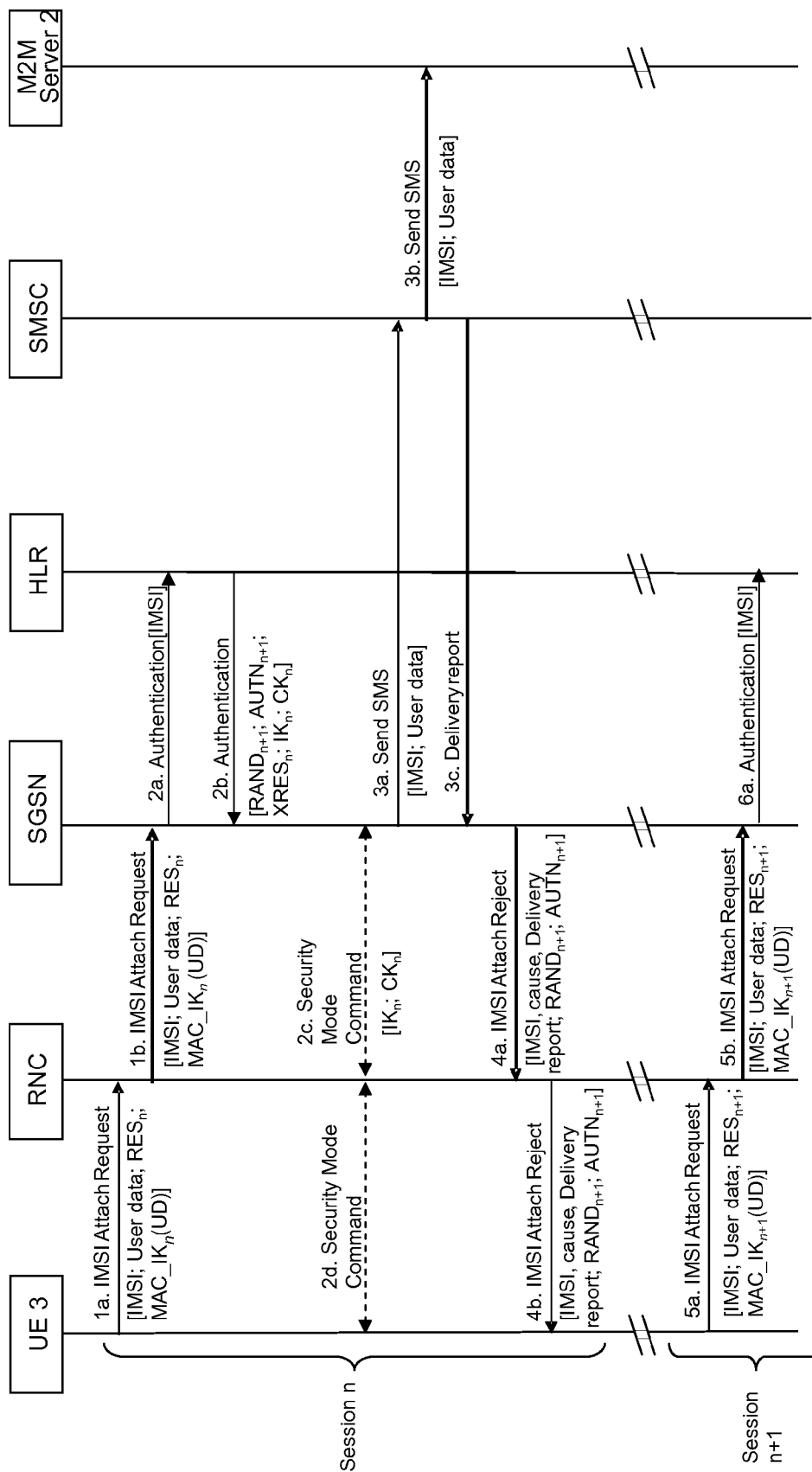

FIG. 4D is a schematic illustration of an AKA procedure wherein user data UD is transferred in signalling messages from a terminal UE 3 to a network 1 and wherein also a Message Authentication Code MAC for the user data UD, denoted as MAC_key(UD), were key denotes the key used to generate the MAC. It should be noted that the message authentication code may also be applied to other data elements within the attach request, or even the entire attach request, thereby enabling integrity protection of other data elements (e.g. IMSI, RES) of the attach request.

In step 1a, terminal UE 3 transmits an attach request containing the subscriber identifier IMSI, application message UD, and an authentication message $RES_n$ in order to request a terminal session n, similarly to FIG. 4A. The authentication message $RES_n$ may be a 128-bit message. $RES_n$ is e.g. obtained by a previous execution of the embodiment of the invention, as will be further explained with reference to FIG. 6.

In addition, the attach request contains a message authentication code MAC for terminal session n. The message authentication code MAC has been generated in the terminal UE 3 using an integrity key $IK_n$ obtained during a previous execution of the present embodiment wherein AKA parameter(s) for terminal session n were already received.

The attach request is forwarded to a further network node, e.g. the RNC or a NodeB, of the RAN of FIG. 1 and forwarded to the SGSN in step 1b.

In step 2a, the SGSN issues an authentication request to the HLR, the authentication request containing the IMSI of UE 3. The authentication request is received at the HLR. The HLR retrieves expected authentication response message $XRES_n$ and cryptographic keys $IK_n$ for integrity protection and $CK_n$ for encryption. Furthermore, AKA parameters $RAND_{n+1}$ and $AUTH_{n+1}$ are generated at the HLR for AKA purposes for a subsequent terminal session n+1 by the same terminal UE 3. $RAND_{n+1}$ and $AUTN_{n+1}$ are both 128-bit long. The HLR may already calculate $XRES_{n+1}$ and $IK_{n+1}$ and $CK_{n+1}$ for the subsequent terminal session n+1 and store these parameters. In step 2b, the HLR reports the quintet [$RAND_{n+1}$, $AUTN_{n+1}$, $XRES_n$, $IK_n$, $CK_n$] to the SGSN. At the SGSN, the authentication of the terminal 3 in the network 1 for terminal session n can be processed by comparing $RES_n$, received in step 1b, with $XRES_n$ of the quintet received in step 2b. Also, the integrity of the user data UD can be verified in the SGSN by generating the expected Message Authentication Code XMAC_$IK_n$(UD) using integrity key $IK_n$ from the quintet and a suitable MAC algorithm. XMAC_$IK_n$(UD) can then be compared with MAC_$IK_n$(UD) received in step 1b. If the authentication is successful, the terminal UE 3 and the network may switch to a security mode (steps 2c, 2d), wherein it is agreed that all further signalling and data communication is protected using keys $IK_n$ and $CK_n$, respectively.

It should be appreciated that the integrity of the user data UD may also be verified by the application server 2. In that case, the SGSN or the HLR should send the integrity protection key $IK_n$ to the application server 2 and the application server 2 should have access to the MAC algorithm.

The user data UD, received in step 1b, may be forwarded to M2M server 2. In the embodiment shown in FIG. 4D, this is done using SMS messages via steps 3a, 3b, but other methods of forwarding the user data from the SGSN to the application server 2 may be applied. In the present embodiment, again optionally, a delivery message confirming receipt of the user data at the application server 2 is received in step 3c at the SGSN.

Since the user data is already included in the signalling message, i.e. the IMSI Attach Request in the present embodiment, it is not necessary to establish a full data connection between the terminal UE 3 and the network 1. Therefore, in steps 4a and 4b, an IMSI Attach Reject message is forwarded to the terminal UE 3 from the network 1 to avoid establishing a full connection and, consequently, save network resources. The IMSI Attach Reject message contains, however, the AKA parameters $RAND_{n+1}$ and $AUTN_{n+1}$ that are received by the terminal UE 3 as the final step of the terminal session n.

The AKA parameter $RAND_{n+1}$ can be used for deriving an authentication message $RES_{n+1}$ and/or keys $IK_{n+1}$ and $CK_{n+1}$ that can be stored for a later terminal session n+1. $AUTN_{n+1}$ is used for network authentication of a subsequent terminal session n+1 to determine that the $RAND_{n+1}$ was received from the correct network.

Steps 5*a*, 5*b* and 6 illustrate the use of $RES_{n+1}$ for a subsequent terminal session n+1 for immediately requesting authentication at the network for this session, also including an encrypted integrity verification message $MAC\_IK_{n+1}$ (UD) encrypted under derived integrity key $IK_{n+1}$.

It should be appreciated that the integrity verification embodiment for the 3G network of FIG. 4D is also applicable for 2G and 4G networks. For modern 2G networks wherein a USIM can be applied, an integrity key is available in the USIM after processing the AUTHENTICATE command. When a SIM is used it is possible to use the encryption key Kc for generating the message integrity code MAC. For 4G networks, a similar procedure as for FIG. 4D can be applied, using e.g. integrity key $K_{NASint_n}$ for the encryption of the integrity verification message $MAC_n$.

Figure 5:
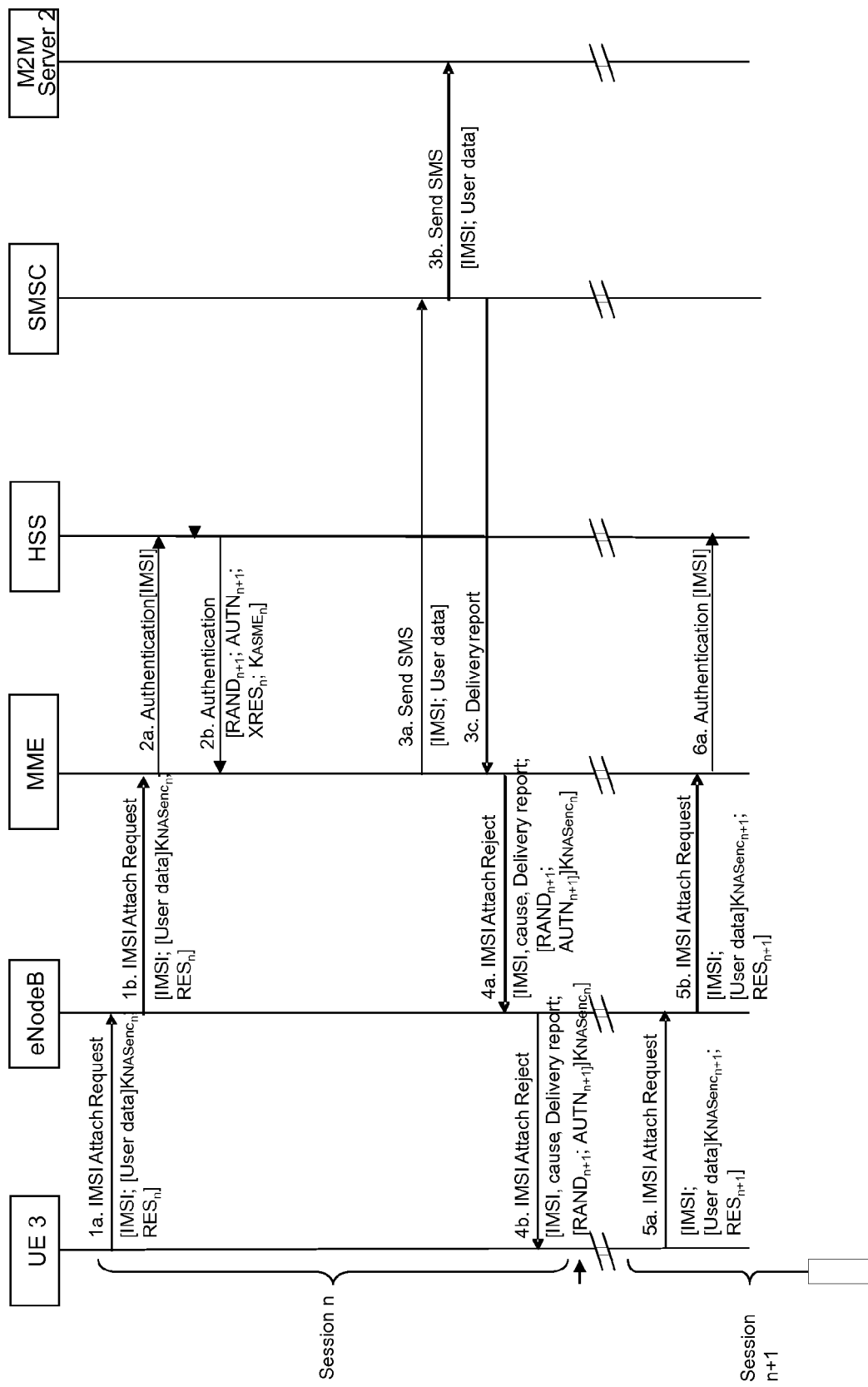
FIG. 5 provides a schematic illustration an AKA procedure for a 4G telecommunications network according to an embodiment of the invention.

FIG. 5 provides a schematic illustration an AKA procedure for a 4G telecommunications network according to an embodiment of the invention both employing encryption of the application message UD and the AKA parameters $RAND_{n+1}$ and $AUTN_{n+1}$. It should be appreciated that these encryption steps are optional.

In step 1*a*, terminal UE 3 transmits an attach request containing the subscriber identifier IMSI, application message UD, and an authentication message $RES_n$ in order to request a terminal session n. The authentication message $RES_n$ may be a 128-bit message. $RES_n$ is e.g. obtained by a previous execution of the embodiment of the invention, as will be further explained with reference to FIG. 6. The attach request is forwarded to the NodeB of the E-UTRAN as depicted in FIG. 1 and forwarded to the MME in step 1*b*. User data UD may be encrypted using encryption key $K_{NASenc_n}$ and an encryption algorithm. Another key, derived from $K_{ASME}$, may however be used for this purpose.

In step 2*a*, the MME issues an authentication request to the HSS, the authentication request containing the IMSI of UE 3. The authentication request is received at the HSS. The HSS retrieves expected authentication response message $XRES_n$ and encryption key $K_{ASME_n}$. Furthermore, AKA parameters $RAND_{n+1}$ and $AUTH_{n+1}$ are generated at the HSS for AKA purposes for a subsequent terminal session n+1 by the same terminal UE 3, equivalent as for 3G networks. $RAND_{n+1}$ and $AUTN_{n+1}$ are both 128-bit long. The HSS may already calculate $XRES_{n+1}$ and $K_{ASME_{n+1}}$ for the subsequent terminal session n+1 and store these parameters. In step 2*b*, the HSS reports the quartet $[RAND_{n+1}, AUTN_{n+1}, XRES_n, K_{ASME_n}]$ to the MEE. At the MME, the authentication of the terminal 3 in the network 1 for terminal session n can be processed by comparing $RES_n$, received in step 1*b*, with $XRES_n$ of the quartet received in step 2*b*. If the authentication is successful, the terminal UE 3 and the network may switch to a security mode, wherein it is agreed that all further signalling and data communication is performed under encryption keys, respectively.

It is to be noted that for EPC systems, there are two security mode commands, one between the terminal UE3 and the MME (the NAS Security Mode Command) for initiating integrity protections and/or encryption of signalling in the core network (the non-access stratum NAS) and another between the terminal UE 3 and the Node (the AS Security Mode Command) to initiate RRC signalling integrity protection and encryption and encryption on the user plane for the radio access network (the access stratus AS).

The user data UD, received in step 1*b*, may then be forwarded to M2M server 2. When the user data is encrypted, the user data UD may decrypted either at the MME using the encryption key derived from $K_{ASME_n}$, such as $KNASenc_n$, received in the quartet and an encryption algorithm or the user data is forwarded in encrypted form for decryption at a further network node or application server 2 having access to the encryption key and the encryption algorithm. In the embodiment shown in FIG. 5, forwarding of the user data UD is done using SMS messages via steps 3*a*, 3*b*, but other methods of forwarding the user data from the MME to the application server 2 may be applied. In the present embodiment, again optionally, a delivery message confirming receipt of the user data at the application server 2 is received in step 3*c* at the MME.

Since the user data is already included in the signalling message, i.e. the IMSI Attach Request in the present embodiment, it is not necessary to establish a full data connection between the terminal UE 3 and the network 1. Therefore, in steps 4*a* and 4*b*, an IMSI Attach Reject message is forwarded to the terminal UE 3 from the network 1 to avoid establishing a full connection and, consequently, save network resources. The IMSI Attach Reject message contains, however, the AKA parameters $RAND_{n+1}$ and $AUTN_{n+1}$ that are received by the terminal UE 3 as the final step of the terminal session n. In the embodiment of FIG. 5, the AKA parameters $RAND_{n+1}$ and $AUTN_{n+1}$ are encrypted using encryption key $KNASenc_n$, that is derived from $K_{ASME_n}$ from the quartet received in step 2*b* and an encryption algorithm to complicate sniffing this parameter on the wireless air interface.

The AKA parameter $RAND_{n+1}$ can be used for deriving a response authentication message $RES_{n+1}$ and/or encryption keys $IK_{n+1}$ and $CK_{n+1}$ that can be stored for a later terminal session n+1. $AUTN_{n+1}$ is used for network authentication of a subsequent terminal session n+1 to determine that the $RAND_{n+1}$ was received from the correct network.

Steps 5*a*, 5*b* and 6 illustrate the use of $RES_{n+1}$ for a subsequent terminal session n+1 for immediately requesting authentication at the network for this session. The application message UD to be sent in this terminal session may be encrypted using an encryption algorithm and encryption key derived from $K_{ASME_{n+1}}$, the latter being derived from the AKA parameter $RAND_{n+1}$ received during previous terminal session n, $K_i$ and a key generation algorithm.

Figure 6:
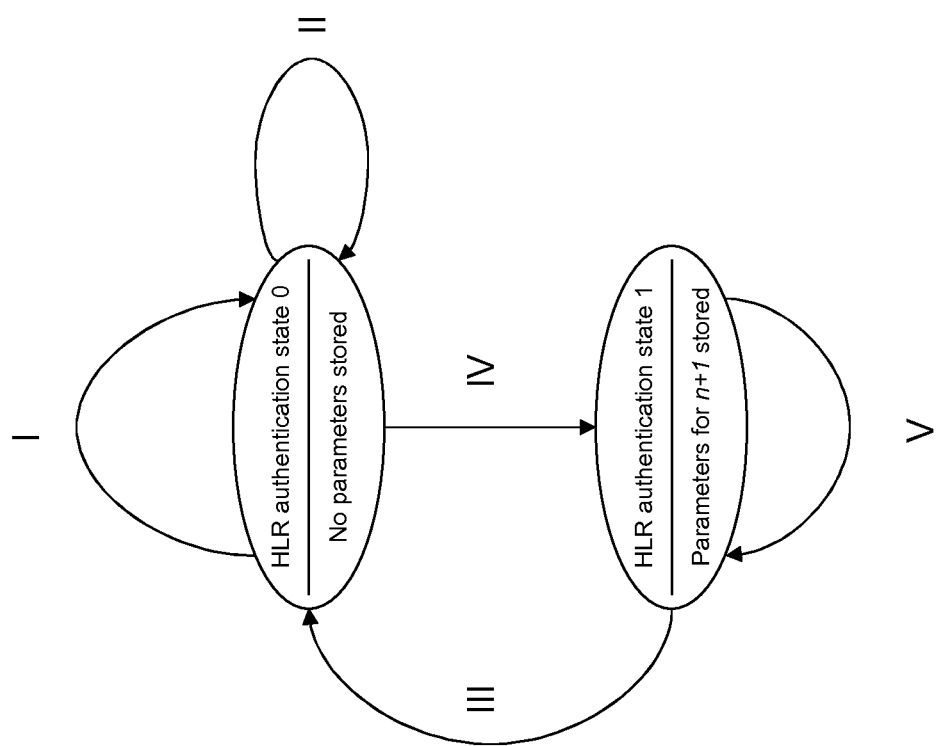
FIG. 6 is a state diagram for a terminal and a network node according to an embodiment of the invention.

FIG. 6 provides a state diagram for the terminal 3 and a network node, such as the HLR or HSS of FIG. 1, depicting states (the circles) and state transitions.

Arrow I illustrates the situation wherein neither the terminal 3 has received an AKA parameter during a previous terminal session for a next terminal session nor the HLR has stored AKA information. Therefore, an IMSI Attach Request cannot contaro a response message RES, and the normal AKA procedure as described in the background section is performed.

Arrow II illustrates the situation wherein the IMSI Attach Request for terminal session n contains $RES_n$. However, the HLR does not have stored the AKA information for this terminal session n including the AKA parameter for terminal session n+1. Therefore, RES, is discarded and the conventional AKA procedure will be followed.

Similarly, as illustrated by arrow III, the conventional AKA procedure is followed if the IMSI Attach Request message does not contain RES, whereas the HLR/HSS would have stored the AKA vector. HLR/HSS then clears the AKA information for terminal session n.

Arrow IV illustrates the situation wherein AKA parameter(s) $RAND_{n+1}/AUTN_{n+1}$ are transmitted from the network to the terminal 3, e.g. in an IMSI Attach Reject Message, a delivery report or an IMSI Detach Accept message from the network. Both the HLR/HSS and the terminal 3 can now calculate and store the AKA information, i.e. $(X)RES_{n+1}$ and/or keys for terminal session n+1.

Finally, arrow V illustrates the situation depicted in FIGS. 3A-3D, FIGS. 4A-4C and FIG. 5, wherein the (first) signalling message from the terminal 3 to the network already contains the response authentication message RES, and the (final) message from the network for terminal session n contains the AKA paramter(s) $RAND_{n+1}$, $AUTN_{n+1}$ enabling both the terminal 3 and the HLR/HSS to calculate and store at least one authentication message $RES_{n+1}$ and/or key for a subsequent terminal session n+1.

The above embodiments enable to reduce the number of messages in the telecommunications network. It should be acknowledged that the basic idea can also be applied outside the field of machine-to-machine communications and does not require that application messages/user data is incorporated in the same (signalling) message as the response authentication message RES.

Figure 7:
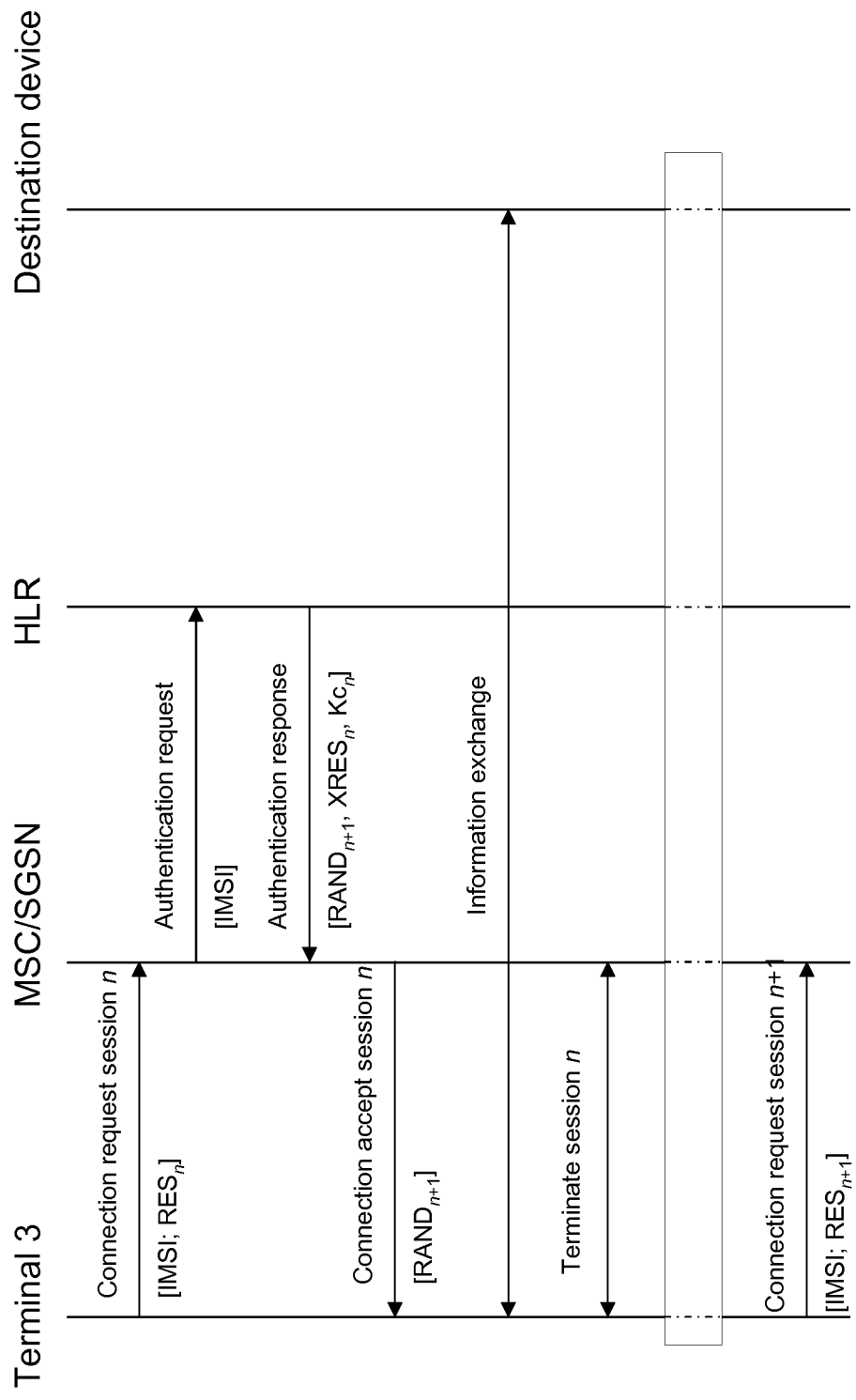
FIG. 7 provides a schematic illustration of another embodiment according to the invention for a 2G network.

A very schematic example of such an embodiment is provided in FIG. 7 for a 2G network. A connection request for a terminal session n already includes a response authentication message $RES_n$ that can be used for authentication of the terminal in the network after receiving the authentication response $XRES_n$ from the HLR. After authentication, information exchange may be performed between terminal 3 and a destination device.

The triplet received from the HLR also contains AKA parameter $RAND_{n+1}$ that is communicated to the terminal 3, e.g. during the acceptance of the connection request as illustrated in FIG. 7 or in another step (e.g. during the termination of session n). The communicated AKA parameter $RAND_{n+1}$ can be used at the terminal 3 for authentication and/or key generation at the terminal side in the same manner as discussed previously. The destination device of FIG. 7 may be a server or a terminal of another user.

It should be appreciated that, while in the above-described embodiments existing keys are applied, alternatively new dedicated keys may be applied that can be derived from the existing keys.

It should further be appreciated that, while in the above embodiments the terminal receives the at least one AKA parameter during the terminal session n for authentication or key agreement for a terminal, other destination devices, such as network nodes SGSN, NodeB, MSC, MME as shown in FIG. 1 may also receive the at least AKA parameter and provide information to the terminal for authentication or key use during a subsequent terminal session n+m.

The invention claimed is:

1. A method for enabling authentication or key agreement by a terminal device in a network comprising the steps of:
   deriving in the terminal device, during a terminal device session, a valid first authentication message; and
   transferring, during the terminal device session, from the network to the terminal device:
      at least one second authentication parameter, wherein the at least one second authentication parameter enables authentication or key agreement by the terminal device in the network for a subsequent terminal device session; and
      an attach reject message.

2. The method as recited in claim 1, wherein the valid first authentication message is derived in the terminal device using at least one first authentication parameter.

3. The method as recited in claim 2, wherein the valid first authentication message is derived in the terminal device using at least one first authentication parameter and a secret key.

4. The method as recited in claim 1, further comprising the step of receiving an attach request from the terminal device at the network for the subsequent terminal device session, wherein the attach request comprises an application message destined for at least one of an application server in the network or an application server connected to the network.

5. The method as recited in claim 4, wherein the attach request comprises at least one of a terminal device identifier, an application message, or the valid first authentication message.

6. The method as recited in claim 4, further comprising the step of receiving the application message at the network in encrypted form during the subsequent terminal device session, wherein the encrypted form being obtained at the terminal device by encrypting the application message using at least one key derived using at least the at least one second authentication parameter received during the terminal device session.

7. The method as recited in claim 1, further comprising the step of receiving an attach request from the terminal device at the network for the subsequent terminal device session, wherein the attach request comprises a message authentication code (MAC) for the integrity protection of at least a portion of the attach request message, and wherein the MAC is obtained at the terminal device by using a cryptographic MAC algorithm and at least one key derived using at least the at least one second authentication parameter received during the terminal device session.

8. The method according to claim 1, further comprising the step of transferring, during the terminal device session, the at least one second authentication parameter from the network to the terminal device in encrypted form.

9. A method for enabling authentication or key agreement for a terminal device in a network, the method comprising the steps of:
   during a terminal device session, the terminal device sending a valid first authentication request from the terminal device containing a first authentication message derived in the terminal device using at least one first authentication parameter;
   during the terminal device session, the terminal device further receiving at least one second authentication parameter and an attach reject message; and
   for a subsequent terminal device session authenticating or enabling key agreement for the terminal device in the network using the at least one second authentication parameter.

10. The method as recited in claim 9, further comprising the step of transmitting an attach request to the network for the subsequent terminal device session, wherein the attach request comprises an application message destined for at least one of an application server in the network or an application server connected to the network and an authentication message derived at the terminal device using the at least one second authentication parameter received during the terminal device session.

11. The method as recited in claim 10, further comprising the step of encrypting the application message transmitted with the attach request of subsequent terminal device session using at least one key derived using at least the at least one second authentication parameter received during the terminal device session.

12. The method as recited in claim 9, further comprising the step of generating a message authentication code (MAC) for integrity protection of at least a portion of an attach request message for terminal device session using at least one key derived using at least the at least one second authentication parameter received during the terminal device session and transmitting the message authentication code to the network in the attach request.

13. The method as recited in claim 9, further comprising the steps of:
    receiving, during a terminal device session, the at least one second authentication parameter from the network to the terminal device in encrypted form; and
    decrypting the at least one encrypted second authentication parameter for deriving an authentication message.

14. A terminal device configured for authentication or key agreement at a network, the terminal device comprising:
    a transmitting interface configured for transmitting, during a terminal device session, a valid first authentication request from the terminal device containing a first authentication message derived in the terminal device using at least one first authentication parameter;
    a receiving interface configured for receiving, during the terminal device session, at least one second authentication parameter for a subsequent terminal device session from the network and an attach reject message; and
    a processor configured for deriving an authentication message or deriving a key using the at least one second authentication parameter received during the terminal device session.

15. The terminal device as recited in claim 14, further comprising a transmitting interface configured for transmitting, during the subsequent terminal device session, at least one of the derived authentication message or data encrypted under the derived key to the network for at least one of authentication or key agreement for the terminal device in the network.

16. The terminal device as recited in claim 14, wherein the terminal device is configured for executing the method as recited in claim 9.

17. A computer program in a non-transitory computer readable storage medium or set of cooperating programs comprising software code portions configured for, when executed by a processor, performing the steps of the method as recited in claim 1.

18. A system comprising:
    at least one terminal device; and
    a network node of a telecommunications network,
    wherein the network node comprises:
        (i) a receiving interface configured for receiving, during a terminal device session, an identifier of the terminal device and a valid first authentication request from the terminal device containing a first authentication message derived in the terminal device using at least one first authentication parameter;
        (ii) a generator configured for generating at least one second authentication parameter enabling authentication or key agreement for the identified terminal device in the network or network node for a subsequent terminal device session; and
        (iii) a transmitting interface configured for transmitting during the terminal device session the at least one second authentication parameter destined for the terminal device and an attach reject message; and
    wherein the terminal device comprises:
        (i) a transmitting interface configured for transmitting, during the terminal device session, the valid first authentication request from the terminal device containing the first authentication message derived in the terminal device using the at least one first authentication parameter;
        (ii) a receiving interface configured for receiving, during the terminal device session, the at least one second authentication parameter for the subsequent terminal device session from the network and the attach reject message; and
        (iii) a processor configured for deriving at least one of an authentication message or a key using the at least one second authentication parameter received during the terminal device session.

19. The system as recited in claim 18, further comprising a transmitting interface configured for transmitting, during the subsequent terminal device session, at least one of the derived authentication message or data encrypted under the derived key to the network for authentication or key agreement for the terminal device in the network for the subsequent terminal device session.

* * * * *